(12) United States Patent
Mathieson

(10) Patent No.: US 12,374,182 B2
(45) Date of Patent: Jul. 29, 2025

(54) SYSTEM AND METHOD FOR DISPLAYING NUMERICAL ATTRIBUTES OF A USER ACTIVITY IN REAL TIME

(71) Applicant: Games Global Operations Limited, Douglas (IM)

(72) Inventor: William Mathieson, Gibraltar (GI)

(73) Assignee: Games Global Operations Limited, Douglas (IM)

( * ) Notice: Subject to any disclaimer, the term of this patent is extended or adjusted under 35 U.S.C. 154(b) by 192 days.

(21) Appl. No.: 17/500,516

(22) Filed: Oct. 13, 2021

(65) Prior Publication Data

US 2022/0143505 A1 May 12, 2022

(30) Foreign Application Priority Data

Nov. 6, 2020 (GB) ...................................... 2017589

(51) Int. Cl.
*A63F 13/00* (2014.01)
*G06T 15/00* (2011.01)
(Continued)

(52) U.S. Cl.
CPC .............. *G07F 17/32* (2013.01); *G06T 15/00* (2013.01); *H04L 67/131* (2022.05); *G06T 2215/16* (2013.01)

(58) Field of Classification Search
CPC ...... G07F 17/32; G07F 17/3267; A63F 13/00; A63F 13/67; A63F 13/798; A63F 13/822
See application file for complete search history.

(56) References Cited

U.S. PATENT DOCUMENTS

| 6,347,999 B1* | 2/2002 | Yuan | A63F 13/812 |
| | | | 472/60 |
| 2005/0159209 A1* | 7/2005 | Fiden | G07F 17/32 |
| | | | 463/20 |

(Continued)

OTHER PUBLICATIONS

Roller Coaster Tycoon 3—https://youtu.be/M0KwV9U2BZI?si=OdDkcbYJFEDYMY0H (Year: 2020).*

(Continued)

*Primary Examiner* — David L Lewis
*Assistant Examiner* — Eric M Thomas
(74) *Attorney, Agent, or Firm* — McDonnell Boehnen Hulbert & Berghoff LLP

(57) ABSTRACT

A computer-implemented method, a multimedia content server, and a computer-readable medium are disclosed. An example method for presenting information on a graphical display to a user performing an activity includes receiving, in near real-time, numerical information to be communicated to the user. The numerical information represents one or more outcomes of the activity. Additionally, the method includes classifying the information based on one or more predefined criteria indicative of an expected impact of the information on the activity. Further, the method includes transforming, in near real-time and based on the classifying, one or more instances of the information to a graphical display format. Still further, the method includes displaying, on the graphical display, the graphical display format as a virtual environment simulating the expected impact of the information on the activity. The virtual environment includes a simulation of a ride.

25 Claims, 14 Drawing Sheets

(51) Int. Cl.
    *G07F 17/32*       (2006.01)
    *H04L 67/131*    (2022.01)

(56) References Cited

U.S. PATENT DOCUMENTS

2008/0274798 A1* 11/2008 Walker ................ G07F 17/3237
                                                                           463/43
2018/0158231 A1* 6/2018 Hellam ................... G06T 15/04

OTHER PUBLICATIONS

Wikipedia; "RollerCoaster Tycoon 3", 6 pages; Retrieved from Internet on Jun. 12, 2024: https://en.wikipedia.org/w/index.php?title=RollerCoaster_Tycoon_3&oldid=1224322799.

* cited by examiner

SYSTEM AND METHOD FOR DISPLAYING NUMERICAL ATTRIBUTES OF A USER ACTIVITY IN REAL TIME

REFERENCE TO RELATED APPLICATION

This application claims priority to United Kingdom Patent Application No. 2017589.9, filed Nov. 6, 2020. United Kingdom Patent Application No. 2017589.9 is incorporated herein by reference in its entirety.

FIELD

The present disclosure generally relates to computer systems that utilize a graphical display to convey information to a user. More particularly, the disclosure is directed to a system and method for converting information to a graphical format so as to convey such information to the user more efficiently.

BACKGROUND

Displaying information to a user in a numerical format may be a straightforward way to convey relevant information. For example, the numerical format can be numerical values that represent a value of a financial asset, as is often used in financial market environments. By updating the numerical values, the relevant information can be conveyed to a user. In some circumstances, however, the numerical values may not allow the user to easily comprehend the relevant information. This may be the case when the numerical values change quickly, when the numerical values change over an extended period of time, or when it is preferable for a user to recognize a difference of a current value to an original or earlier value, or for a user to recognize a trend in the numerical values.

SUMMARY

In a first aspect, a computer-implemented method for presenting information on a graphical display to a user performing an activity is disclosed. The method includes receiving, in near real-time, numerical information to be communicated to the user. The numerical information represents one or more outcomes of an activity being performed by the user. Additionally, the method includes classifying the information based on one or more predefined criteria indicative of an expected impact of the information on the activity. Further, the method includes transforming, in near real-time and based on the classifying, one or more instances of the information to a graphical display format. Still further, the method includes displaying, on the graphical display, the graphical display format as a virtual environment simulating the expected impact of the information on the activity. The virtual environment includes a simulation of a ride.

In a second aspect, an article of manufacture may include a non-transitory computer-readable medium, having stored thereon program instructions that upon execution by at least one processor, cause a computing device to perform the operations of the first aspect.

In a third aspect, a computing device may include at least one processor, a memory component, and program instructions stored in the memory component that, upon execution by the at least one processor, cause the computing device to perform the operations of the first or second aspects. In a fourth aspect, a system may include various means for carrying out the operations of the first, second, or third aspects. In a fifth aspect, a computer program may include machine-readable instructions executable to cause a computing device to perform the operations of the first, second, third, or fourth aspects.

In embodiments of the disclosure in which a computer software product is used, the product may be non-transitory and store instructions on physical media such as a DVD, or a solid-state drive, or a hard drive. Alternatively, the product may be transitory and in the form of instructions provided over a connection such as a network connection that is linked to a network such as the Internet.

These aspects, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
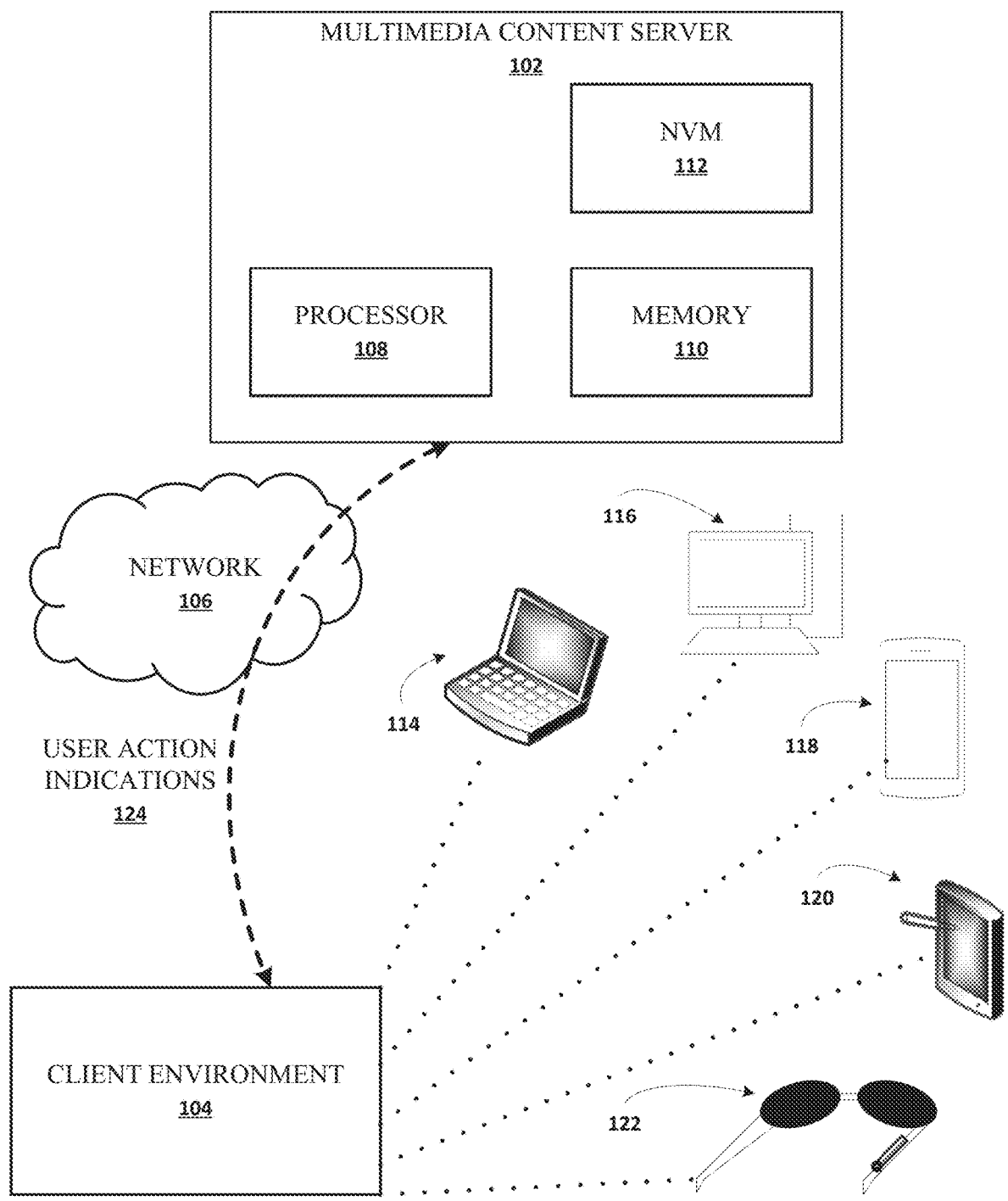
FIG. 1 is an example of a multimedia content serving an environment, in accordance with example embodiments.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features may be present in each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to skill in the art, may occur in amounts that do not preclude the effect the characteristic was intended to provide.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" with a described list of at least two terms is to indicate any of the listed terms or any combination of the listed terms.

The use of ordinal numbers such as "first," "second," "third," and so on is to distinguish respective elements rather than to denote a particular order of those elements. For the purpose of this description, the terms "multiple" and "a plurality of" refer to "two or more" or "more than one."

Further, unless the context suggests otherwise, the features illustrated in each of the figures may be used in combination with one another. Thus, the figures should be generally viewed as component aspects of one or more overall embodiments, with the understanding that not all illustrated features may be present in each embodiment.

I. INTRODUCTION

As noted above, the display of numerical values or attributes to a user may not adequately convey to the user a desired effect or impact of a change of such value, and the full information associated therewith. This may be particularly relevant when the numerical value changes rapidly and/or over an extended period of time. In some instances, a trend in the change of a numerical value may need be immediately apparent to a user. In such instances, it may be useful to provide the information to the user in a user-friendly format.

Many types of information can be represented quantitatively and measured in terms of a net positive result, a net negative result, or a neutral result. For example, financial information (such as information related to a trading platform associated with the user, information related to a financial portfolio of the user (such as a retirement portfolio, a real-estate portfolio, a savings account, and so forth), a cost function for manufacturing products, a revenue function from a sale of products, a profit function, and so forth) can be represented quantitatively, and measured in terms of gains, losses, and break-even amounts. Also, for example, information generated in a gaming environment (such as online games), or information generated in a gambling activity (such as sports related bets, bets related to political events, gambling bets at a casino, and so forth), can be represented quantitatively, and measured in terms of wins, losses, and ties. As another example, almost any type of user behavior can be represented quantitatively, and measured in terms of a reward, a setback, and a neutral outcome. A net positive result can be associated with a reward for positive behavior, a net negative result can be associated with a deduction for negative behavior, and a neutral outcome can be associated with a neutral behavior. For example, a driving behavior of a user driving a vehicle (such as an automobile, an airplane, a watercraft, and so forth) can be modeled, in real-time, and the outcome can be measured in terms of a positive driving behavior, a negative driving behavior, and a neutral driving behavior. Also, for example, an insurance premium, and/or an insurance rebate amount can be associated with the driving behavior, and values of the premium and/or the rebate can be provided to a user. As another example, a health behavior (e.g., related to a weight loss program, a blood sugar maintenance program, a heart rate monitoring program, and so forth) of a person can be modeled over time, and the outcome can be measured in terms of a positive health behavior, a negative health behavior, and a health behavior.

For example, in trading financial assets, particularly stocks or the like, the value of the assets may change rapidly, and in a continuous manner. Timing of initiating or locking in a sale of such assets may be crucial. Recognizing trends and comparing a current, immediate value to a previous value may also be of interest to a user. In some instances, a user friendly display of changing numerical values of a financial asset over time to an owner or trader thereof, can enhance understanding and comprehension of the value change by the user.

As another example, a user may participate in an online gaming experience. In some instances, the user may be distracted by aspects of the online gaming experience that are not of interest to the user. Accordingly, the user may wish to avoid viewing these aspects. This may be the case in, for example, online reel-based slot games in which a user may win nothing or may win a small amount on a single iteration. However, the user may have to watch an animation of spinning reels and view an outcome of the iteration, when the user does not have an interest in iterations that lead to a loss or a small win. A time between consecutive wins may be higher for high-volatility games than for low-volatility games. For example, high-volatility games may generally have higher win values, but the wins may occur less frequently. Removing the time delay in displaying iteration that result in a loss or a small win may greatly enhance up the game playing experience for the user by speeding up the game. For example, results of a spin can be determined by a computing device in near real-time, with any potential delay in providing such result to the user being a result of reel animations that are to be displayed to the user.

Generally, users may prefer to play a game to unlock a bonus and/or special round or feature, where larger or more significant wins may be expected and/or achieved. Therefore, users may prefer to complete the iterations that result in the small wins or losing spins as quickly as possible, and wait for a spin result that leads to a bigger win. Some users may play an online game, such as an online slot game, only to view and experience a bonus round, with the anticipation of a big win amplified by the unique aspects provided during such bonus rounds. A user may wish to keep track of an account or wallet balance or of their win/loss total at any time during gameplay. Although such information may be provided as numerical values, it may be preferable to transform the numerical values to a user-friendly format.

Some aspects described in greater detail in this disclosure are in a context of online gaming. However, as set out above, the same features can be applied to any numerical attributes that can be encoded as a win, a loss, or a tie.

As an example in the context of online gaming, a user may be playing a virtual game, and may place a plurality of sequential wagers. One or more outcomes of the virtual game may be received by a multimedia content server. The results of the sequential wagers are received by the multimedia content server in order. The result of the wagers is numerical information that may be important to, and may have an impact, on the user, for example on the user's financial position. The information may be classified according to one or more predetermined criteria, the one or more criteria representing the expected impact of the information on the activity being performed by the user: a win may be beneficial to the user, and a loss may be detrimental to the user. Then, one or more instances of the received information may be transformed to a graphical display format. For example, a loss may be transformed to a graphical display of an amusement ride ascending on a track, while a gain may be transformed to a graphical display of the amusement ride descending on a track. Then, the graphical display format may be provided for display to a user as a virtual environment simulating the expected impact of the information on the activity being performed by the user. The virtual environment may include a simulation of a ride, such as, for example, an amusement ride. The movement pattern of the ride, whether up, down or the like, may then represent the cumulative monetary influence of each bet placed by the user.

The mathematics that generate the information for use in the method above can be those of a standard online wager game, whether of the user's choosing, or of a developer's choosing. The wager game can be a reel-based slot game. In some embodiments, when a bonus round or bonus feature is triggered by the underlying slot game, the display of the ride to the user terminates, and the user is instead shown the bonus round itself, which may be the feature of the slot game that the user is particularly interested in. In some embodiments, however, a user may not wish to be shown such a bonus round, but may rather choose to continue viewing the simulated ride, with a bonus round perhaps providing a particular trick, display or visually pleasing effect.

II. EXAMPLE ARCHITECTURE

FIG. 1 illustrates an example of a multimedia content serving environment (MCSE) 100. The MCSE 100 includes a multimedia content server (MCS) 102, and a client environment 104. The example MCS 102 and client environment 104 communicate with one another via a network 106, such as the Internet. The network 106 can be a wide area network, a local area network, a near-field communication network, and the like.

The MCS 102 includes a processor 108, a memory 110, and non-volatile memory (NVM) 112. An example of the MCS 102 is a multimedia content server 200 as described with reference to FIG. 2. The example processor 108 is configured to perform various operations itself or assist other components in performing their particular operations. The memory 110 can be in communication with the processor 108 and can store instruction code that is executable by the processor 108 to facilitate operations by the processor. An example of the memory 110 of the MCS 102 includes instruction code that facilitates displaying the graphical display format to the user as a virtual environment.

An example of the NVM 112 corresponds to a mass storage device, such as a hard drive or a group of hard drives, flash drive, etc. An example of the NVM 112 stores a database that includes the numerical information, the transforming of one or more instances to a graphical display format, etc., described above. While a single NVM 112 is illustrated, the NVM 112 can correspond to a group of NVM devices. Further, while illustrated as being within the MCS 102, the NVM 112, or group of NVM devices, as the case may be, can be stored externally, such as in the so-called cloud (e.g., one or more data centers).

The client environment 104 can include a display, a keyboard, a touch screen display, a mouse, etc. (not shown). The client environment 104 can include client devices such as a laptop 114, a desktop computer 116, a mobile computing device 118, a tablet device 120, a virtual or augmented reality device 122, and so forth. In some embodiments, the client environment 104 can include a display in a vehicle, such as for example, an automobile, a watercraft, an aircraft, an autonomous or semi-autonomous vehicle, and so forth. In some embodiments, the client environment 104 can include a display in an exercise machine, such as, for example, an exercise bicycle, a treadmill, a rowing machine, a step mill, and the like. The example client devices 114-122 can implement a browser that facilitates receiving content, such as a rendered virtual environment from the MCS 102. The client environment 104 communicates user action indications 124 to the MCS 102. For example, a user action indication 124 can be communicated when the user of the client device presses a particular region of a touch screen display, selects a menu option, initiates a trigger condition, interacts with objects in a virtual reality and/or augmented reality environment, and so on.

Figure 2:
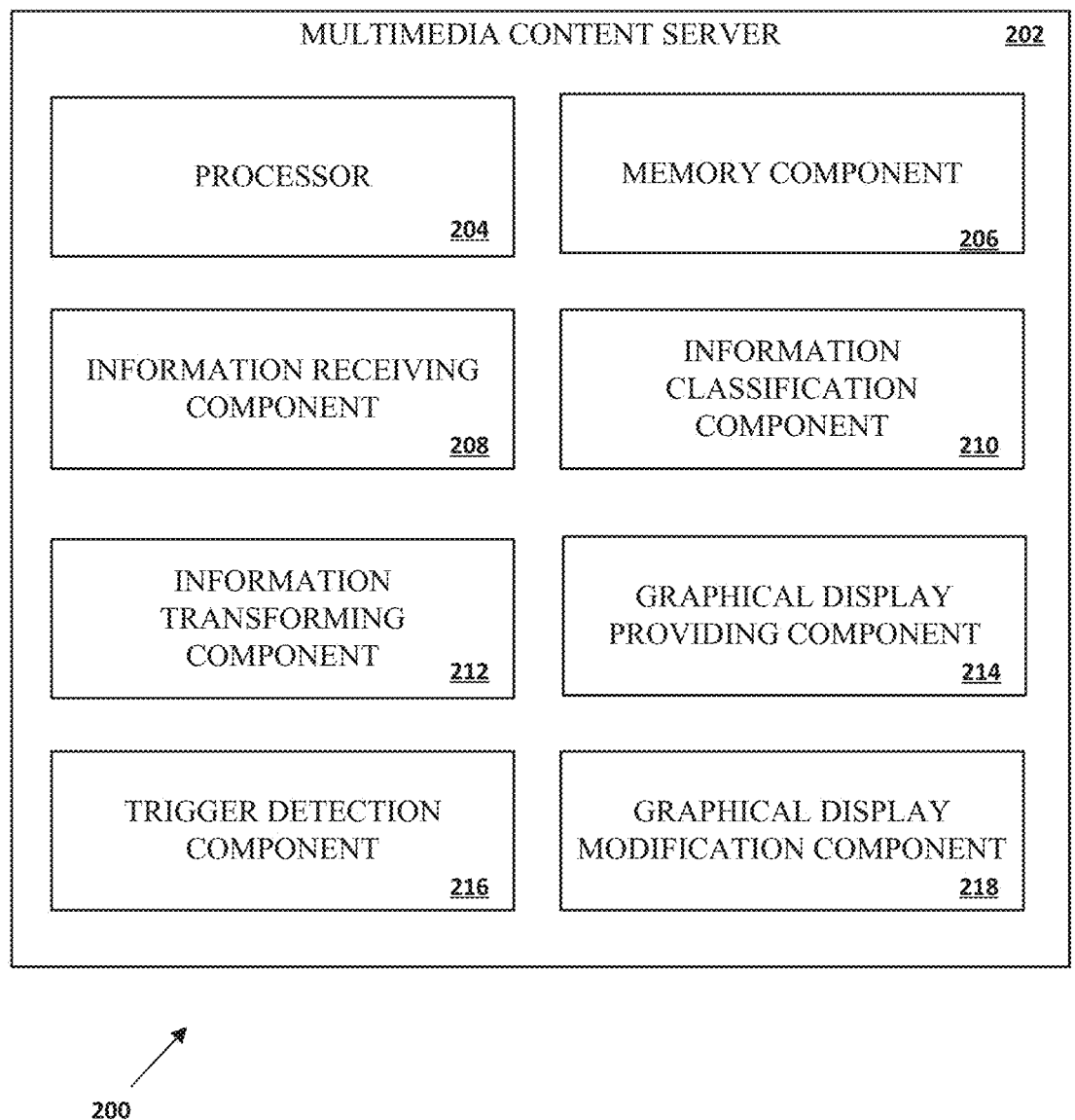
FIG. 2 is a block diagram depicting an example embodiment of the multimedia content server of FIG. 1.

FIG. 2 is a block diagram 200 depicting an example embodiment of the multimedia content server of FIG. 1. The multimedia content server 202 may be a server hosting various aspects of the method, a personal electronic device, a purpose-built gaming machine, or the like.

The multimedia content server 202 is configured to implement the methods described. In this regard, the example multimedia content server 202 includes a processor 204 configured to perform operations or assist other components in performing their particular operations. In this regard, a memory component 206, in communication with the processor 204, and stores instruction code executable by the processor 204 to facilitate performing various operations by the processor. Within examples, the multimedia content server 202 can include an information receiving component 208, an information classification component 210, an information transforming component 212, a graphical display providing component 214, a trigger detection component 216, and a graphical display modification component 218.

The information receiving component 208 is configured to receive numerical information from an internal or external source of numerical information, to be then communicated to a user. The information may be numerical attributes originating from a random number generator (RNG) associated with a gaming server. The multimedia content server 202 itself may, however, be such a gaming server, and the RNG may form part thereof. The RNG may be associated with an online slot game, and may be used to generate results to be used as information received. A user may wager or place a bet on the result of an instance of a wagering game associated with the present method, without viewing the slots itself. Rather, the result of the bet will be communicated to the multimedia content server, and may then be displayed to the user in an alternative graphical format providing a virtual environment.

The information classification component 210 is configured to classify the received numerical information according to predetermined criteria. Depending on the specific embodiment, the criteria may be fixed according to what its impact on a user thereof may be, such as, for example, an increase or decrease in a user's financial position. Alternatively, the criteria may be received from and defined by the user or an entity interacting with the multimedia content server 202. For example, a user may wish to set limits at which specific information should be communicated and presented to the user, ranges within which a display format may change, or the like.

The information transforming component 212 is configured to transform the classified information, or set of such classified information, to a graphical display format. The graphical display format enables the underlying meaning or value of the information to be conveyed to a user in a more efficient manner. The format for presenting data can be more effective than, for example, providing a stream of numbers. The present format can provide the appropriate level of detail, such that the relevant information is more readily understood and acted upon by a user.

The graphical display providing component 214 is configured to provide the transformed graphical display format for display to the user, such as a display associated with the multimedia content server 202, or to a multimedia content server currently associated with the user (e.g., a personal electronic device or a stand-alone gaming device).

The example trigger detection component 216 is arranged to detect a trigger event associated with the information received. The trigger event can occur when a limit or predetermined threshold has been reached, or when a specific bonus sequence in the underlying slot game supporting defining the RNG calculations has been reached. When the trigger event occurs, the display of the mapped graphical format switches, via the graphical display modification component 218, to an information screen, a termination screen, a bonus round of the actual underlying slot game, or the like. Breaking out to a bonus game of the underlying slot game can allow the user to experience a desired bonus round of the underlying slot game, without the need for the user to view uninteresting or irrelevant iterations of the slot game.

III. EXAMPLE OPERATIONS

Figure 3:
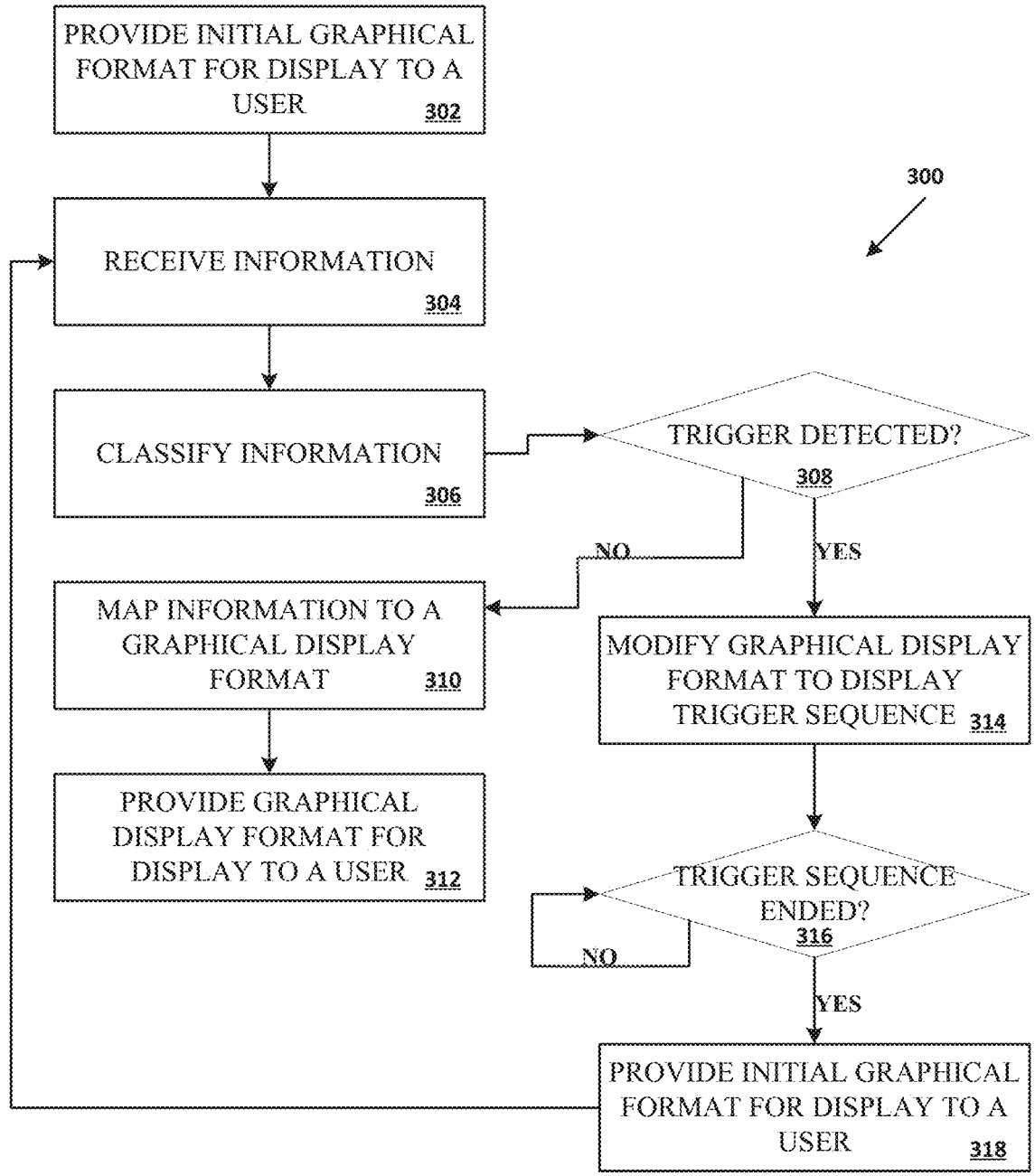
FIG. 3 is a flow diagram showing an example of a method that can be performed using an electronic device, such as the multimedia content servers shown in FIGS. 1 and 2.

FIG. 3 depicts a flow diagram 300 that illustrates an example method that may be performed using an electronic device, such as the multimedia content server 105 of FIG. 1 or the multimedia content server 202 of FIG. 2. Operations of the method are shown in the blocks 302 to 318. The example method can relate to providing a more efficient manner to display information to a user. Any operation described below, or elsewhere in this description, with respect to FIG. 3, can be performed, at least in part, by a processor, such as the processor 110, or processor 204, executing software program instructions.

Block 302 includes providing, by the electronic device, an initial graphical display format for display to the user. The graphical display format may be shown (displayed) to the user via a display screen uniquely associated with the electronic device (for example where the electronic device is a gaming machine), or a display of an electronic device of the user, such as the user's own mobile or computing device. The initial graphical display format may be a standard display screen at an initial stage of display.

Block 304 includes receiving, in near real-time, numerical information to be communicated to the user. The numerical information may represent one or more outcomes of an activity being performed by the user. The information may be required for monitoring or interest purposes. In a gaming example, the information may be the result of a wager placed by the user. The method may require the user to select or specify details of the wager prior to the result being received. The result may be obtained via interaction with an RNG, facilitating the play of a reel-based slot game. Where the information received relates to financial instruments, it may be a value of the instrument.

Block 306 includes classifying the information based on one or more predefined criteria indicative of an expected impact of the information on the activity. Classifying the information may involve preset or predetermined categories, which may be simple, for example positive, negative and neutral. The categories may be much more complex, with different levels or ranges of positive and negative. Alternatively, a rate of change over multiple consecutive results or values may be considered, which may involve multiple wagers (in a gaming example), or multiple results over a given time interval, for example several minutes for gaming or other embodiments.

Block 306 includes checking whether a trigger event has occurred. In a gaming environment, the trigger event may be one that triggers a bonus feature, round or some form of special instance in the reel-based slot game on which the wagers, results and information received are based. In a financial environment, the trigger may be that a specific threshold has been attained, for example that a pre-determined value of a financial instrument has been reached which triggers automatic selling thereof, or that an instrument has been classified according to a system that influences the financial instrument's value or risk profile, and the like.

If such a trigger is not detected, the method may move on to block 310. In block 310, one or more instances of the classified information are mapped, in near real-time, to a graphical display format. This may involve, for example, transforming the positive, negative or neutral information to a display format. As an example, the display format may involve an amusement ride, and the classification of the information may determine the path of the amusement ride takes.

Block 312 includes displaying, on the graphical display, the graphical display format as a virtual environment simulating the expected impact of the information on the activity, wherein the virtual environment comprises a simulation of a ride. The virtual environment may include a simulation of a ride that includes various positive and negative positions (e.g., heading down or up or sideways at various angles and/or speeds) as well as a neutral position (e.g., riding a straight, flat section). This may be, for example, on a display screen of the user's own electronic device, or on a display screen uniquely associated with the electronic device facilitating operation of the method. Then, by watching the relevant display, a user may be informed of the effect of the information originally received by watching the alternative graphical display simulating a virtual environment instead of observing the actual numerical values. The simulation of the ride may include a rollercoaster cart simulated to move on a track, or for example a mine cart or dragon ride.

As the mapped information is displayed to the user, the method returns to block 304, as further information is received. If, at block 308, a trigger event is detected, the method moves to block 314.

Block 314 includes modifying the graphical display to show the sequence initiated by the trigger event. In a gaming environment, this may involve the display of the bonus sequence, feature or unique aspect of the underlying slot game that has been triggered. In a financial environment, this may involve displaying information about the event that has occurred, it may provide addition options or steps the user may wish to take, or may detail termination reasons in a termination screen.

Block 316 includes checking whether the trigger sequence has terminated. If it has not, the method remains at block 316. If it has terminated, the method may move to block 318.

Block 318 includes modifying the graphical display again to show the default display, possibly at the same configuration at which the trigger event occurred, at a modified configuration taking into account the result of the trigger sequence or options selected by the user, or any other appropriate configuration, possibly even the initial graphical display format described in block 302.

Then, the method may return to block 304, where further information is received and may be processed according to the same method.

Any of the blocks of a flow diagram or a component in a block diagram may be provided by hardware or by software associated with the electronic device. The electronic device may correspond to a personal computer, laptop computer, personal digital assistant, smartphone, feature phone, satellite phone, server computer, tablet, wearable computer, stand-alone gaming device, or the like. Appropriate components may form part of such a device for the operation of the required method on that device. Further, the electronic device may be configured to communicate wirelessly or over a wired communication network to another electronic device. The various components forming part of each electronic device may be configured to communicate with each other via an appropriate communication interface, while an appropriate external communication interface may facilitate communication with other electronic devices, whether forming part of the present systems or not.

Notably, the features of classifying information according to its effect on the user and transforming the information to a graphical format that is displayed to the user, may more effectively communicate such information to the user. In a gaming environment, allowing a break from the standard display, to an alternative format associated with a trigger event, may allow a user to partake in a unique feature or bonus round that they are particularly interested in, which may be associated with an underlying reel-based slot game. In a financial environment, breaking from the standard display may allow a user to focus on the trigger event, which may be that pre-determined values have been reached, losses have been made, tax implications may occur, or the like. Additional steps offered to a user may allow further appropriate management steps of the user's finances.

In a gaming environment, where some users are particularly interested in bonus rounds, special rounds or special features of a slot game, the present method may allow the user to view an amusement ride influenced by the results of the slot game, typically their wins or losses. Then, the game may break away to still show the user the bonus or special round the user intended to reach when initially starting to play the game. In addition, the present method may process several results at the same time, or may at least process individual results much faster than during normal slot play. In normal slot play, reels are shown to spin, even if a high-speed mode, often called "turbo mode", is selected. There may be a delay between initiating a spin, and a result being shown to a user. Spinning reels, or symbols moving into position, may be shown during this delay. With the present method, the spinning reels may not be shown to a user during normal gameplay. Instead, the results of such spins may be displayed to a user in the form of a continually updated simulation of an amusement ride, with the path of the amusement ride determined by the results of the spins. When a bonus round is triggered, gameplay may slow down, show the bonus round as it plays out to the user, which may provide the desired suspense to the user in a situation where the user can win more significant amounts. Removing the display of spinning and landing reels may speed up gameplay and processing of results by five to ten fold, or more. Progressing through non-bonus spins in order to reach a bonus round may thus occur much faster. The time between consecutive bonus features may thus be greatly reduced.

Figure 4:
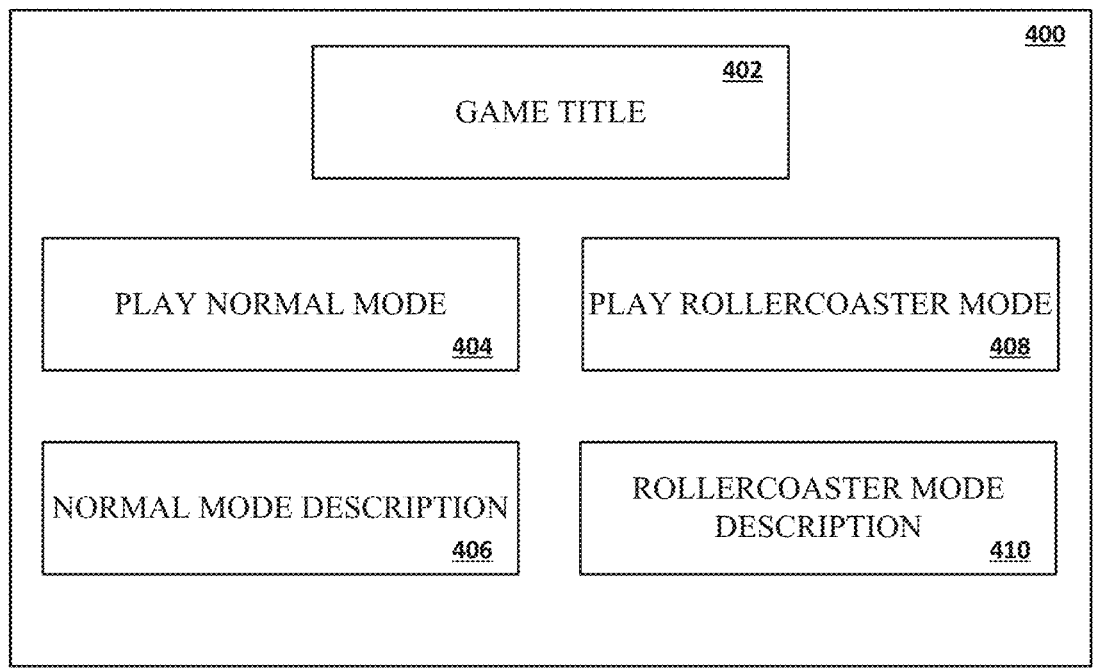
FIGS. 4 and 5 are graphical user interface displays, illustrating menu option available to a user, in accordance with example embodiments.
Figure 5:
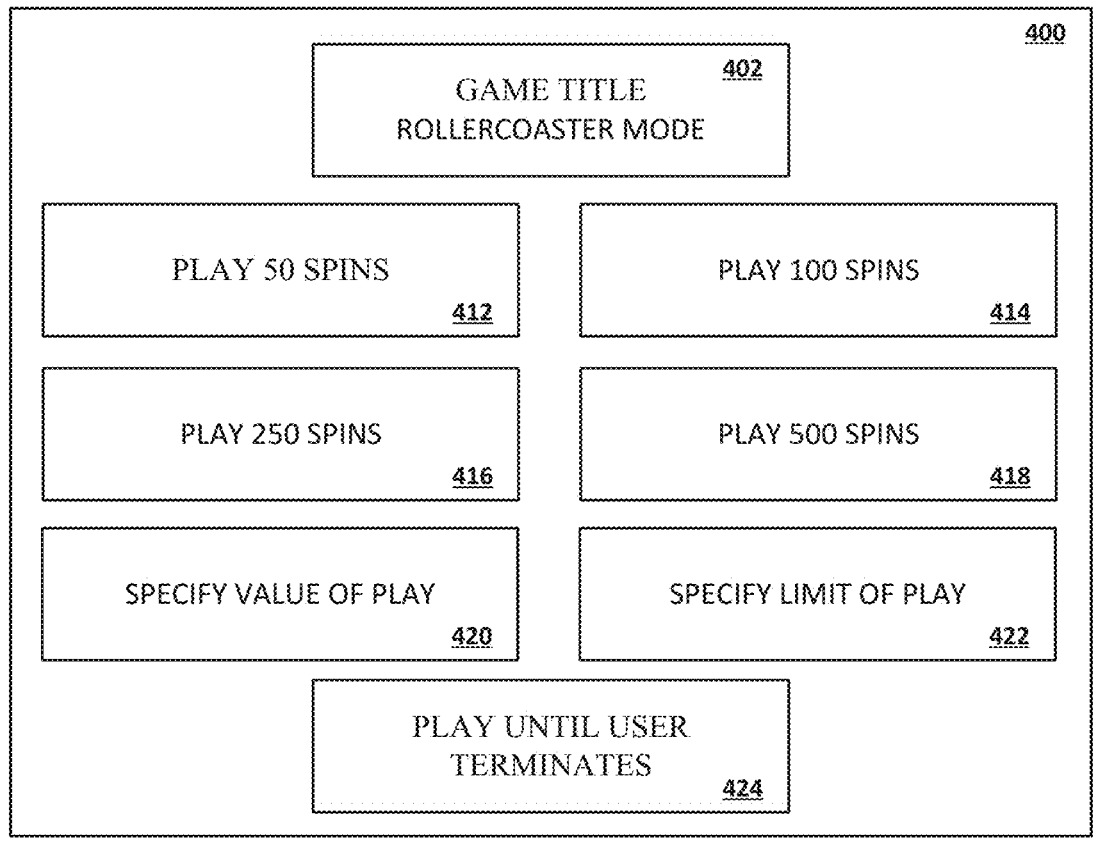

FIGS. 4 and 5 are graphical user interface displays, illustrating menu option available to a user, in accordance with example embodiments.

As illustrated in FIG. 4, a user can be presented with a GUI 400 when commencing play of a reel-based slot game. The GUI can be displayed on an electronic device of the user, or on an electronic device operated by the user. The GUI can show a title of the game in a title field 402, and provide the user with options as to how they wish to play the relevant game. A first option can be provided in the form of a first selectable field 404, which can indicate that such selection will allow normal play of the game, for example normal play of a reel-based slot game. The first selectable field 404 can be labeled "Play normal mode", or the like. The term "normal" mode, as used in this description, generally refers to a normal reel-based slot game that may be played by the user, where the user initiates individual reel spins. A first description box 406 can be provided adjacent the first selectable field 404, and may describe details of the normal mode.

A second selectable field 408 can be provided which is labeled "Play Rollercoaster." This field allows the user to receive wager results according to the method set forth in this description. A second description box 410 can be provided adjacent the second selectable field 408, which provides details of the "Rollercoaster" mode. Selection of the second selectable field leads the user to a next display screen.

For illustrative purposes, an alternative graphical display can take the form of a ride in a virtual environment. The ride of the present embodiment is a roller coaster ride. However, any ride, such as those commonly found in a physical "amusement" or "theme" park can be provided. Indeed, any ride with positive, negative, and neutral attributes, or any alternative graphical display with similar characteristics, may be utilized with the present method.

Referring to FIG. 5, the GUI can be updated with further options to the user. The title field 402 can be updated to indicate that the user has entered the rollercoaster mode. Various further selectable options can be provided to the user at this point, such options relating to how many traditional "spins" the user would like to play, with the results of such spins provided to the user in a more efficient form allowed by the present method. The term "spins" as used in this disclosure, generally refers to iterations of the traditional reel-based slot game, which the user can elect to play, as illustrated in FIG. 5. As mentioned previously, the probabilistic model that predicts the outcomes of the spins to be played by the user, can be based on a probabilistic model for the underlying slot game, with similar predictive models for win rates, win likelihoods, and/or bet sizes available to the user. In some example embodiments, the user can choose to opt out of an animation of each spin played by the user, and instead choose to directly view the outcomes of the spin, in the format displayed by the present methods.

Different, example options available to the user are shown for illustrative purposes. A first option 412 initiates 50 spins. A second option 41 initiates 100 spins. A third option 416 initiates 250 spins, and a fourth option 418 initiates 500 spins. These first four options simply provide an efficient manner for the user to select multiple spins to play out, and may be any pre-set value, such as options 412, 414, 416 and 418 or any number specified by the user. The user is allowed to select the wagering value for each of the multiple spins. A fifth option 420 allows a user to specify a size of wager the user wishes to play, with the accompanying number of spins for that value then being played. A sixth option 422 allows the user to specify a playing limit by, for example, allowing the user to specify a monetary amount that they do not wish to lose, inclusive of any wins they may obtain during play. A seventh option 424 allows the user to indicate that they wish to play until they indicate that they wish to stop play.

A play by the user can automatically terminate if the user does not have sufficient funds in an account associated with their gameplay. When a predetermined value or number of spins is selected by the user, the full amount can be deducted from an account associated with the user, prior to play being initiated. An insufficient account balance can then prevent play, or require topping up of the account to allow play.

It is envisaged that regulatory restrictions may dictate which options a user may select at this stage. Different regulatory requirements may influence options available to a user. For example, continuous play until a user positively stops play may not be allowed in some jurisdictions. In some jurisdictions, regulatory specifications may require that a user be allowed to stop play, even if they have pre-selected a specified number of spins.

FIGS. 6 to 11 are graphical user interface displays, illustrating an amusement ride in a virtual environment, in accordance with example embodiments. Like reference numerals may be used to indicate like features. As an example, a user may have selected the second option 414 in FIG. 5, to play 100 spins.

Figure 6:
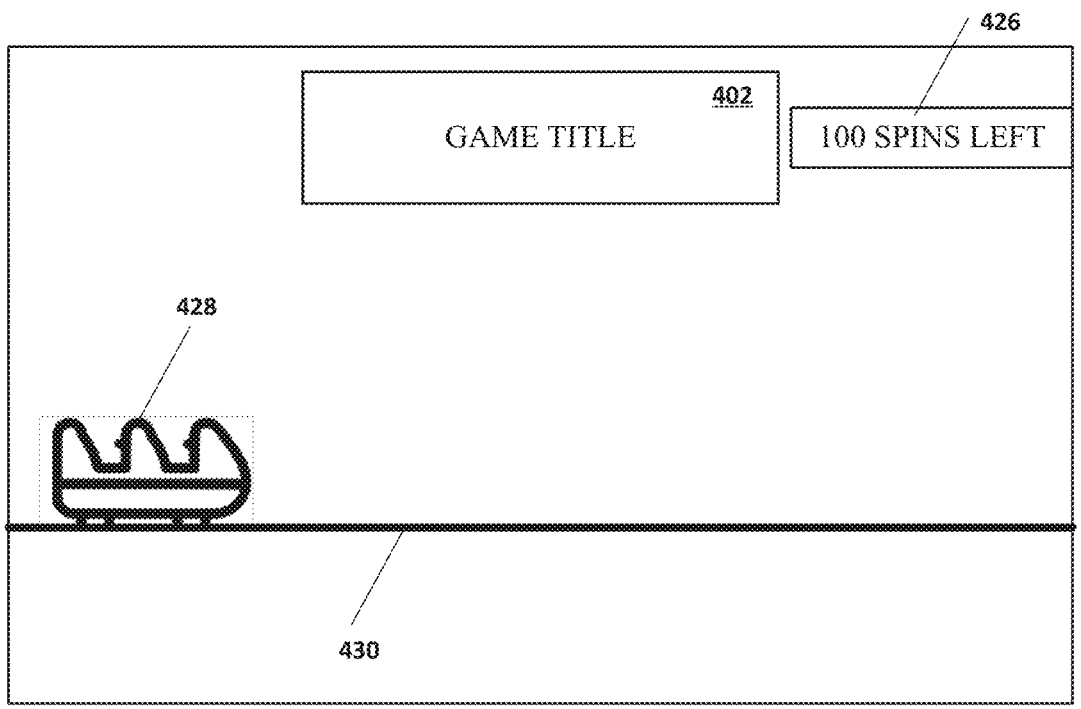
FIGS. 6 to 11 are graphical user interface displays, illustrating an amusement ride in a virtual environment, in accordance with example embodiments.

Referring to the example of FIG. 6, assume that a "rollercoaster" mode has been initiated by a user. An initial graphical display format is displayed to the user. The display includes a game title field 402, a spin counter 426, and a rollercoaster cart 428 on a track 430. Movement of the cart 428 is simulated, with the track moving from right to left across the screen, creating the appearance that the cart 428 is moving from left to right along the track 430. The track 430 may be rendered to be flat, or level, with the cart 428 remaining at a stable height.

A processor in the background can process iterations of the underlying reel-based slot game based on the probabilistic model of the underlying game. An RNG associated with the slot game can determine a result for an iteration of the game, where each iteration can result in a win or a loss for the user. The size of a wager made by the user can influence the size of the win to the user, with a maximum loss being equal to the size of the wager placed. The resulting win or loss form part of the information to be processed according to the present method. The information is then classified according to predetermined criteria. In a simple, example embodiment, three classifications are available—a win (or a net positive result), a loss (or a net negative result), and a neutral result (where a win is equal to the wager placed, providing a net zero effect to the user). A magnitude is also be assigned to each classification.

Figure 7:
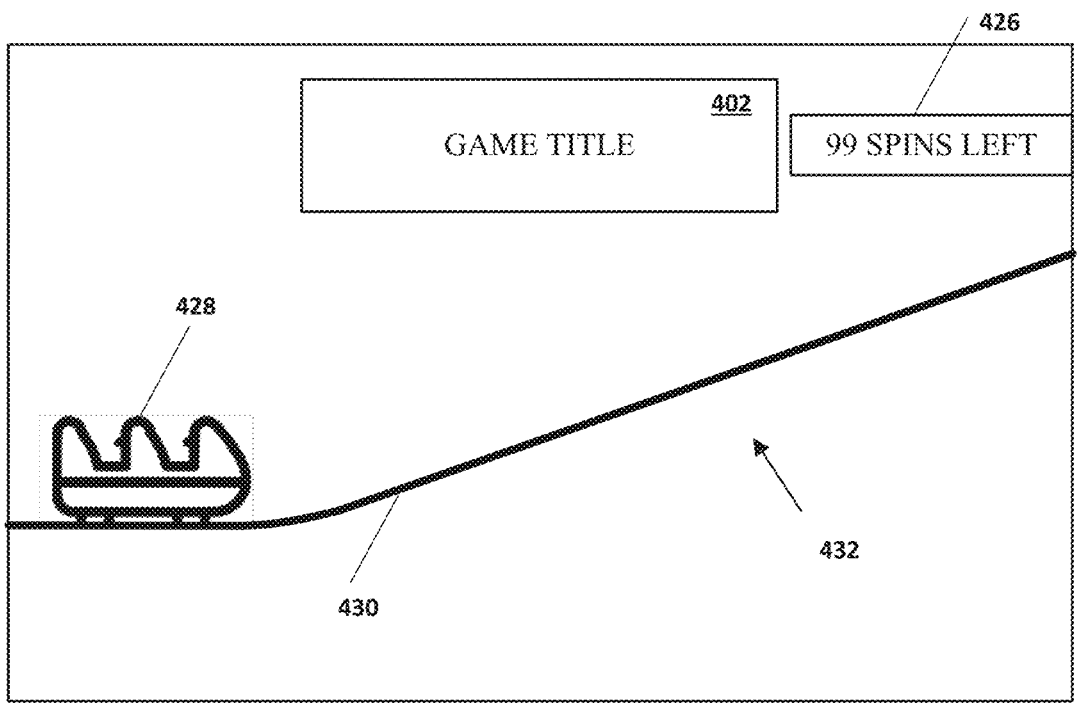

Referring to FIG. 7, a first wager, associated with the first of the 100 spins selected in FIG. 5, is shown to have not yielded a win. As illustrated, the full wager is lost. This information is mapped to a graphical display format, which is provided to the display. The display as shown to the user is updated with the track 430 inclining, causing the cart 428 to rise as it moves along the track 430. The direction and/or speed of the cart can visually represent, in an efficient and readily understood manner, the information of most significance to the user.

In a real-life rollercoaster at a theme park, a typical experience during a ride entails the rollercoaster cart rising up along a track to a peak height, after which the rollercoaster drops and gains speed, allowing the cart to traverse all sorts of loops, twists and turns. During a rollercoaster ride, a rise eventually leads to a drop. The rises in the track are designed to build an expectation that a drop will occur, with the drops being the exciting parts of the ride.

In much the same manner, the present embodiment aims to virtually simulate such a rollercoaster ride. Just like a drop on an actual rollercoaster is a fun or exciting part to look forward to, and is generally also the reason that a user may choose to ride on a rollercoaster 428, a drop on the virtual rollercoaster 428 provided by the present method is what a user looks forward to during gameplay. A rise or incline 432 in the track 430 may be considered the part that must be endured to arrive at a drop. A losing wager must be endured before a drop may be experienced. The upward incline in FIG. 7 thus simulates a losing wager.

Reel-based slot games may have return to player (RTP) percentages that range from 90% to 98%. For a game with a 96% RTP, the probabilistic model underlying the game is generally configured to pay out, on average, 96% of the money wagered on the game. This average, however, relates to overall play, not necessarily to a single player playing, for example, 100 spins. Rather, it can be expected that out of 100 spins, some spins may result in wins, and some may not. For every spin that does not result in a win, a player may know that a next spin could result in a win. This is what the present embodiment aims to achieve—a couple of losses may lead to the rollercoaster cart climbing an incline on a track, with the user waiting for the inevitable drop that could come with a win. This may result in user excitement, as the user waits to see which path the rollercoaster will take as the game iterations play out. This is also a more efficient way of presenting the results of a user's wagers. Since there are no spinning reels, or reels coming to a rest, to be displayed to the user, the results can be processed and displayed without undue delay. In some examples, results can be processed one by one, allowing the rollercoaster track to be generated on a result-by-result basis. Alternatively, all selected spins, presently 100 spins, can be generated and the entire track mapped out for the user, preferably before the initial graphical display is shown to the user. The track can then be displayed to the user according to the predetermined classification of each result.

Figure 8:
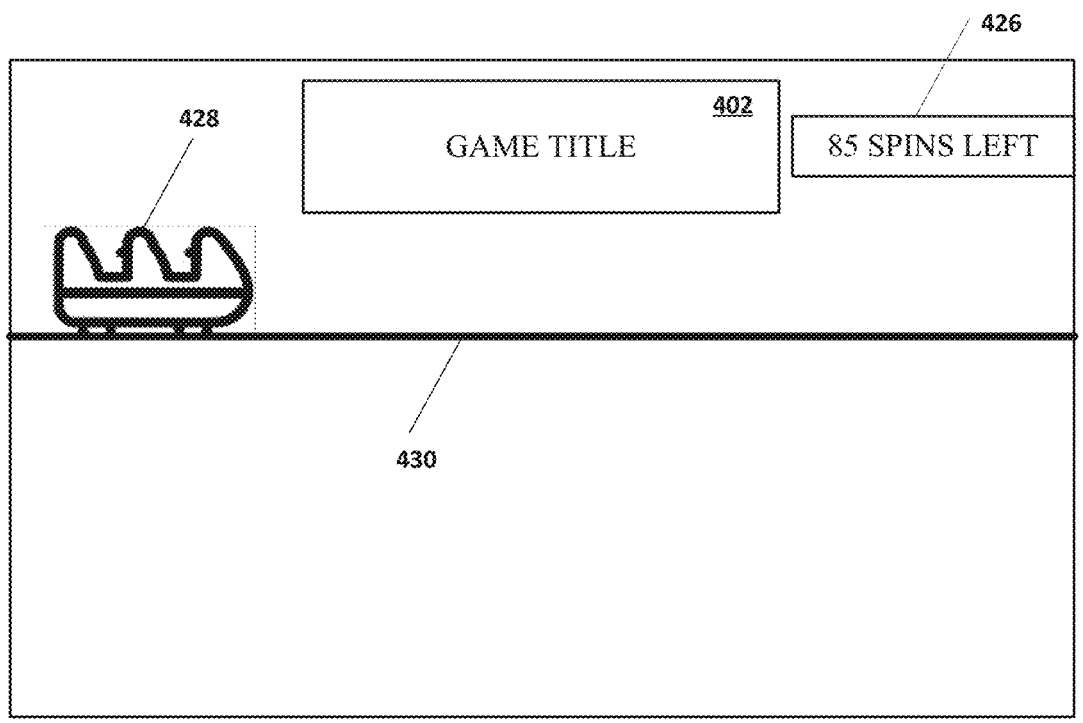

Referring to the example of FIG. 8, some spins do not lead to a net positive or net negative effect for the user, but rather, to a net neutral effect. This occurs when, for example, a wager of $1 leads to a win of $1; that is, the user wins their money back or breaks even. Then, the virtual rollercoaster 428 is rendered to travel on the track 430, which can be depicted as a horizontal track in FIG. 8.

Figure 9:
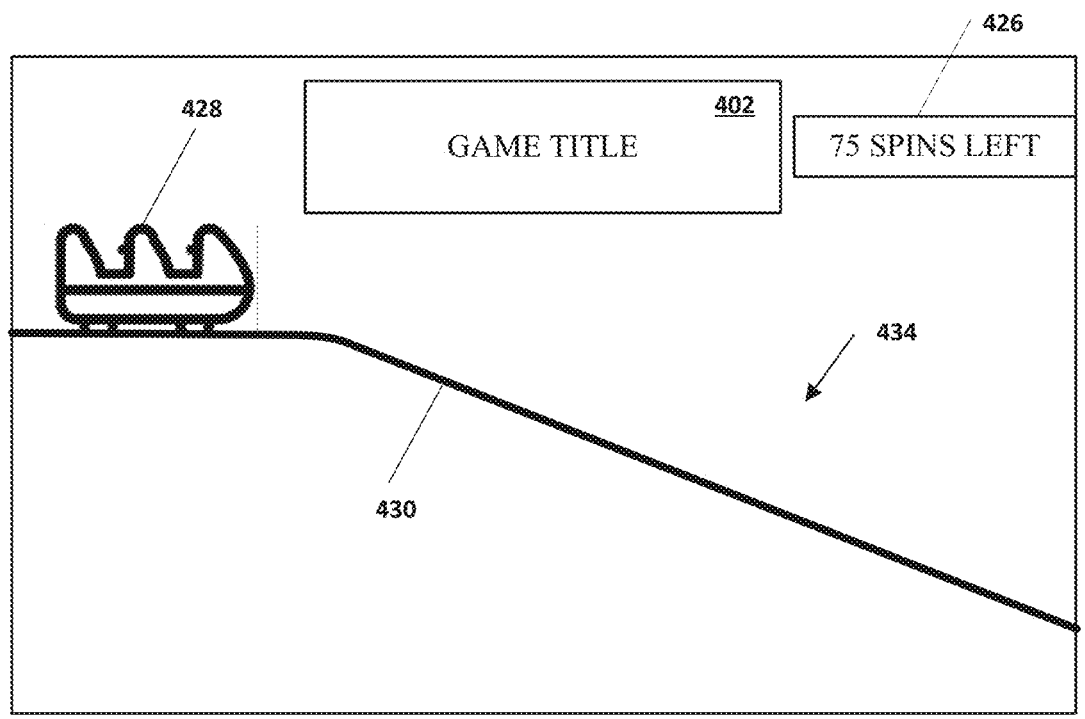

Referring to the example of FIG. 9, a net positive effect, or net win, leads to a decline 434, or drop, in the track 430 as shown. This clearly indicates to the user that they have obtained a desired result, namely a win.

Figure 10:
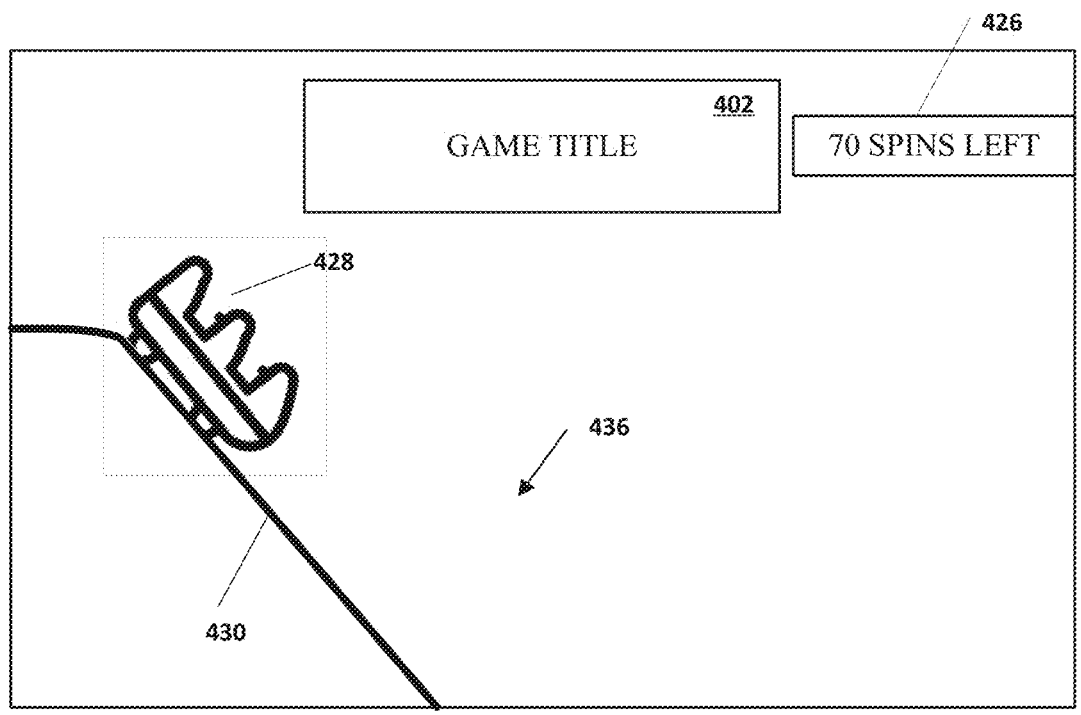

The value of a win can influence the extent of the decline, or drop, of the track 430. FIG. 10 illustrates a steep decline 436 in the track 430. Such a steep decline (and/or a rapid cart speed) indicates to the user that they have obtained an exceptional result. The cart 428 is shown to travel along the track 430 as it descends down the decline 436. In the example shown, an angle of a decline below a reference horizontal line indicates a value of a net positive result. Likewise, an angle of an incline above a reference horizontal line indicates a value of a net negative result.

An example embodiment may combine inclines, declines and neutral results as described above to form a track. However, much more complicated track configurations may be provided. Loops, twists, turns or the like may all be displayed, whether in response to information received and classified accordingly, or whether simply in order to provide variety in the track's conditions. Background and environmental changes may also be provided.

The display provided to the user can be configured in any desirable format. One such example format is where multiple spin results are shown on the display at the same time, allowing the user to see, for example, the result of the upcoming nine spins. The user is then provided with the format of the track, already generated and shown to them, and can follow the cart as it moves along the track.

Figure 11:
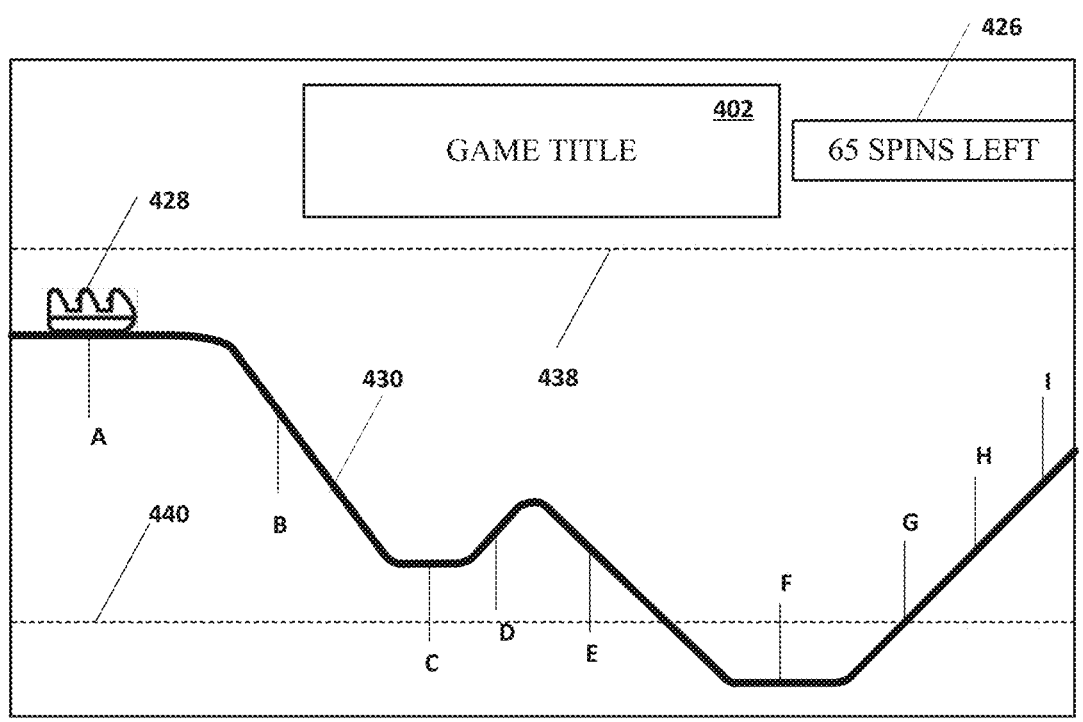

FIG. 11 shows a screenshot of an example embodiment where nine spin results may be displayed to the user at the same time. These results are designated "A" to "I" and are marked along the track 430 to indicate the portions of the track that correspond to the respective results. Result "A" represents a wager with a net neutral result, and forms a horizontal part of the track 430. Result "B" represents a win and forms a drop in the track 430. Result "C" represents another neutral result, forming another horizontal part of the track 430. Result "D" represents a losing wager, forming an inclined part of the track 430. Result "E" represents another win, forming a drop. Result "F" represents another neutral result, forming a neutral part of the track 430. Results "G", "H" and "I" are subsequent losing wagers, resulting in an extended incline in the track 430. As the cart 428 moves along the track 430 and the track 430 moves off the display on the left, spins number ten, eleven, twelve and onwards may then need to be mapped and added to the track 430 as it continues to be rendered on the right of the display.

In some embodiments, a vertical height of the ride is proportional to the value of the net negative result or the net positive result, as the case may be. For example, the vertical movement of the cart can be directly linked to a monetary result of a playing session. The higher the vertical height, the greater the loss. The lower the vertical height, the greater the win. In some embodiments, the virtual environment may be configured to adapt to a movement of the ride to maintain a visibility of a current position of the ride to the user. For example, under some circumstances, the vertical climb or drop requires the display to pan up or down to ensure the cart continues to be visible to the user. Then, the user may run the risk that they become unsure of a current result of their gameplay (e.g., whether the user is winning or losing), particularly over an extended period of play. This may be prevented by using a background to aid a user in keeping track of their gameplay.

In FIG. 11, an upper dotted line 438 and a lower dotted line 440 can be provided, which may simulate boundaries. For example, the virtual environment can include an upper horizontal line (e.g., upper dotted line 438) that indicates a first threshold value of a net negative result. A current position of the ride above the upper horizontal line (e.g., upper dotted line 438) indicates that a value of a net negative result is greater than the first threshold value. Likewise, the virtual environment can include a lower horizontal line (e.g., lower dotted line 440) that indicates a second threshold value of a net positive result. A current position of the ride below the lower horizontal line (e.g., lower dotted line 440) indicates that a value of a net positive result is greater than the second threshold value. In some embodiments, a background depicting clouds can be rendered above the upper horizontal line (e.g., upper dotted line 438). In some embodiments, a background depicting water can be rendered below the lower horizontal line (e.g., lower dotted line 440). A background depicting a clear sky can be rendered between the upper horizontal line (e.g., upper dotted line 438) and lower horizontal line (e.g., lower dotted line 440).

In some embodiments, a portion of the graphical display above the upper horizontal line (e.g., upper dotted line 438) can be configured to display one or more images of a cloud rendered in one or more shades of a color. A darker shade of the color indicates a larger value of the net negative result. For example, when the cart is in the clouds, above the boundary defined by the upper horizontal line (e.g., upper dotted line 438), it may indicate to the user that they have a particularly negative balance for a current game session. Similarly, in some embodiments, a portion of the graphical display below the lower horizontal line (e.g., lower dotted line 440) can be configured to display an image of water rendered in one or more shades of a color. A darker shade of the color indicates a larger value of the net positive result. For example, when the cart is in the water, underneath the boundary defined by the lower horizontal line (e.g., lower dotted line 440), it may indicate the user has a particularly positive balance for the current game session. When the cart is in-between the boundaries, it may indicate to the user that their balance is within the defined boundaries, possibly at an acceptable tolerance. A gradual transition between boundaries is also possible. The upper and lower dotted lines can correspond to threshold values set by a game developer, by regulatory considerations, or by a user. There may be multiple thresholds, for example, a darker shade of the color of the water can indicate that the cart is deeper in the water, i.e. that the positive balance is greater than the balance that corresponds to a lighter shade of the color of the water. Similarly, a darker shade of the color of the clouds can indicate that the negative balance is greater than the balance that corresponds to a lighter shade of the color of the clouds.

In some embodiments, the display of the rollercoaster ride is interrupted when a trigger condition is detected. As previously described, a trigger condition may be, for example, that a bonus round or special feature has been activated in the reel-based slot game where mathematics underpins the rollercoaster track creation. These bonus features may be those features that a user generally aims to trigger during gameplay of an underlying reel-based slot game. The viewing of the rollercoaster-type feature may be desired by a user to speed up normal play, but still allow the bonus round to be viewed and played out. In some embodiments, in response to detecting that the bonus feature has been triggered, a trigger sequence is displayed. For example, when the bonus feature in the underlying game has been triggered, the display is modified to show a trigger sequence. The trigger sequence may be, for example, a number of free spins played out during a bonus round.

Figure 12:
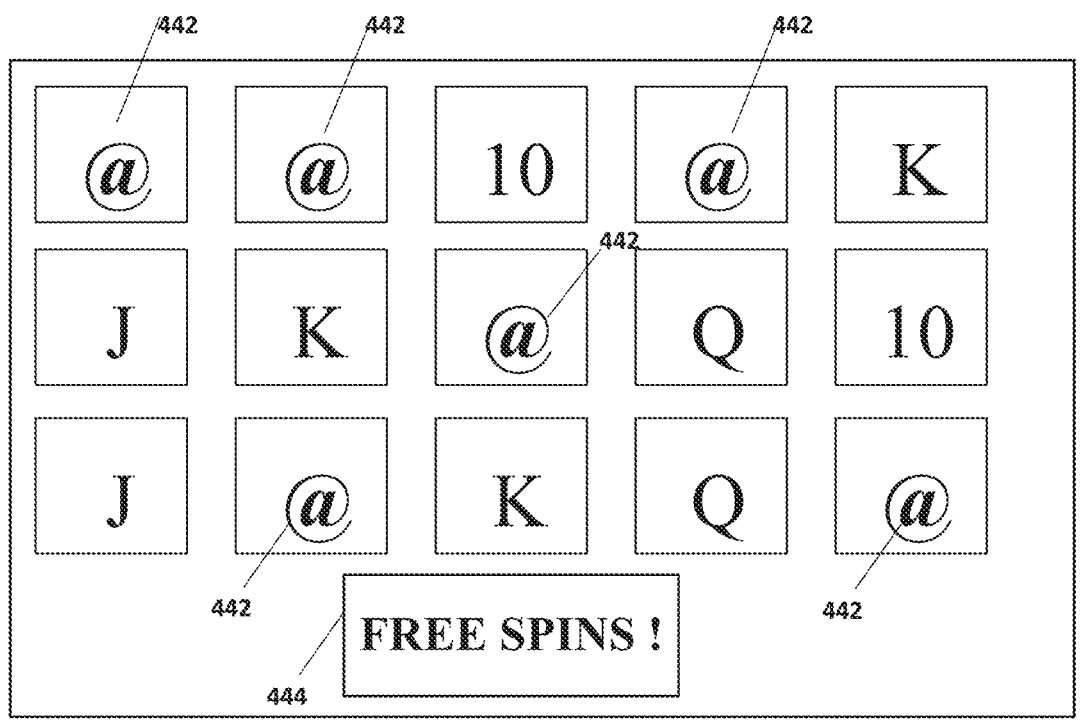
FIGS. 12 and 13 are alternative display formats that may be provided to a user, in accordance with example embodiments.
Figure 13:
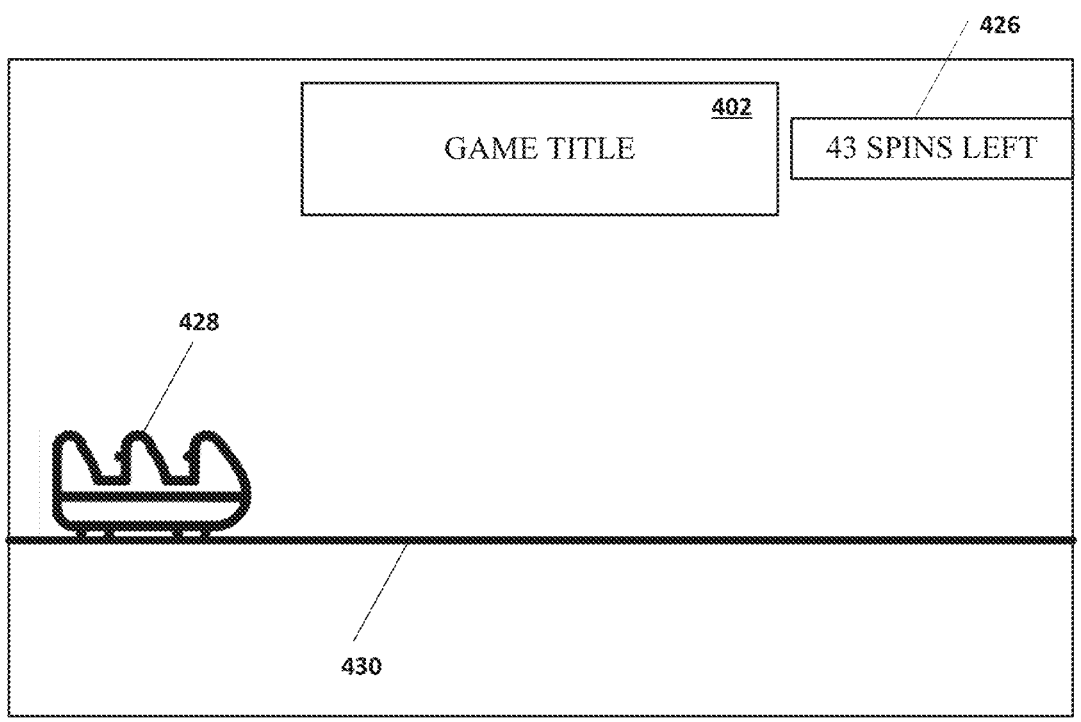

FIGS. 12 and 13 are alternative display formats that may be provided to a user, in accordance with example embodiments.

Referring to FIG. 12, the example display is illustrated to have been modified after a trigger condition has occurred, and shows the reels of the slot game in the position that a bonus game has been triggered. In some examples, the trigger may be an outcome that includes five or more special symbols, presently an "@" symbol 442, that have landed as a result of the spin. Various royal symbols are displayed on the reels. The triggering symbol position is displayed to the user, and an information box 444 indicates that free spins have been awarded to the user. The sequence of free spins, being the bonus game, can now be played out to the user while showing the reels and the various spins, as applicable. In some embodiments, it may be detected that a bonus game associated with the trigger sequence has ended. In response to detecting that the bonus feature has ended, the displaying of the virtual environment is resumed. For example, when the bonus game has been completed, the graphical display reverts to a default display.

Moving now to FIG. 13, the graphical display is illustrated as having been updated and shows an initial graphical display format of the rollercoaster mode, including the rollercoaster 428. The track 430 may be updated based on updated information received.

It may be noted that in FIG. 13, the background may be updated to reflect the winnings a user has received during the trigger sequence of the bonus game. As an example, a user may have been in a clouded area, above an upper boundary, indicating that they have a negative balance. After some winnings received in the trigger sequence, they may have a positive balance, and their background may be clear sky, or even water.

In some embodiments, a special graphical effect or sequence can be performed by the rollercoaster to simulate a celebration for winnings received in the bonus round. Loops, twists, turns or the like may all be incorporated into the track after a trigger sequence, which can also be used to transition from a previous background to a new background. Special graphical effects or the like may also be provided as a result of normal wins during base gameplay, i.e. outside of a bonus round.

Some aspects of the underlying slot game can directly map to the display in the rollercoaster mode. As an example, where a bonus feature is nearly activated (for example where one less than the required number of scatter symbols are obtained), a special route may be taken by the cart, or a special character or visual effect may be shown in the background. Audible effects may also be employed.

Figure 14:
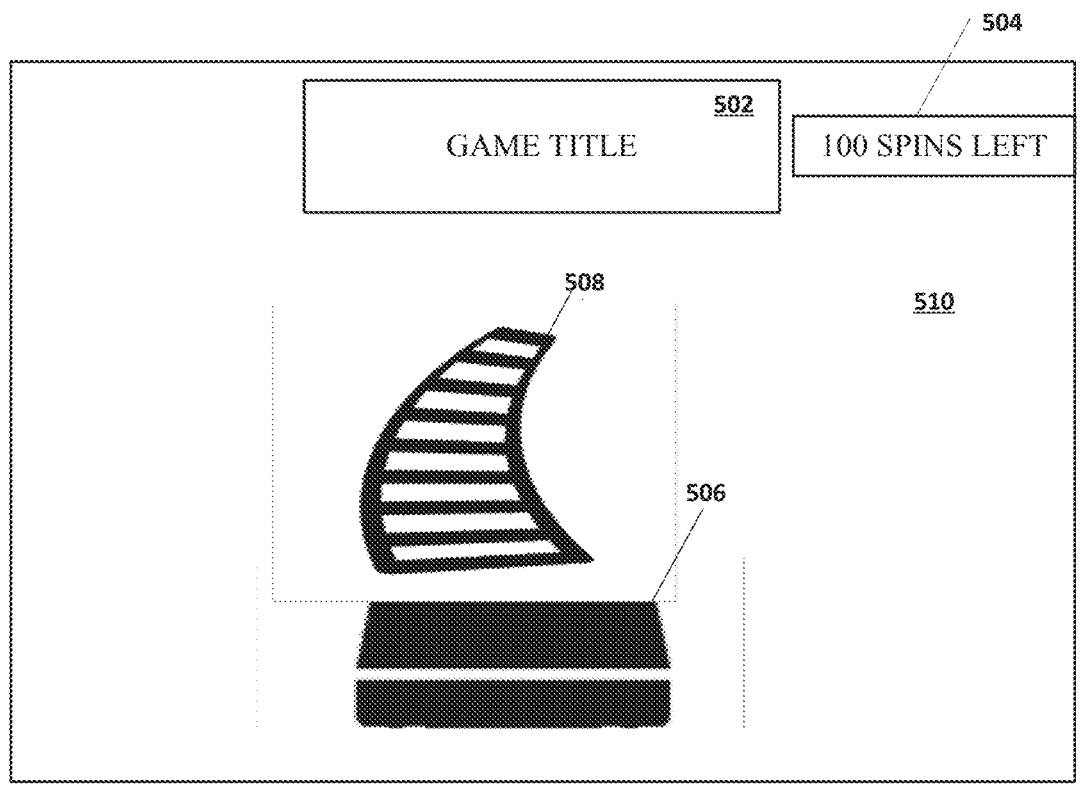
FIG. 14 is a graphical user interface display, illustrating a first-person perspective of a user on an amusement ride, in accordance with example embodiments.

FIG. 14 is a graphical user interface display, illustrating a first-person perspective of a user on an amusement ride, in accordance with example embodiments. Referring to FIG. 14, it should be noted that the rollercoaster feature need not be displayed in two dimensions, and can be displayed from the side. A game title block 502 and spin counter 504 is provided. FIG. 14 shows a different viewpoint, with a user having a first-person view as if inside a cart 506. In some embodiments, the ride appears to move on a track 508. The track 508 is rendered to appear to extend in front of the cart 506. The virtual environment is configured to simulate a user experience for the user to experience the ride as it moves on the track 508. For example, the user views the track 508 displayed in front of them, with movement being simulated "into" the display. This provides additional freedom of movement. In a side view, up and down may be the only options available, whereas in the first person view of FIG. 14, left and right movement is also possible. The latter view can better simulate loops, and can provide additional options for effects or the like to be displayed. It can also allow the ride to avoid obstacles or the like that may be provided, or improve the display of neutral results. These obstacles can be linked to some aspects of the game. Collectable elements, such as coins, potions, or the like may also appear on the track, and may be linked to aspects of the underlying slot game. Collection of such elements may influence the ride. For example, collecting a coin may be a small win, leading to a drop. If such coin is missed, it indicates that a bonus feature was nearly achieved in the underlying slot game. It will be apparent that a third person view is also possible, with similar advantages as for a first-person view. A user can be provided with an option to select a view of their choice. A surrounding background 510 can be updated with display elements as appropriate.

Background changes may be more efficiently implemented when using a first or third-person viewpoint. As these views generally require a larger track view, with less upper and lower area of the environment being visible, background changes may be more gradually implemented. In addition, the length of track shown to the user at any one time may be reduced with these views, allowing less of an advanced generation of results before the ride is initiated. Background changes may assist users in recognizing trends in the results. In addition, background changes may assist a user to keep track of their current positions in relation to an original position.

As mentioned previously, a user may be allowed to set specific limits at which they wish the rollercoaster feature to terminate, for example upon reaching a specified total win or loss. As some users primarily try to reach a bonus round during slot play, the user may also be provided an option to stop gameplay immediately after a trigger sequence, which may be the relevant bonus feature, has played out. Combinations of rules may also be allowed. For example, a user may initiate 100 spins. If all 100 spins have played out without a bonus feature having triggered, the rollercoaster feature will stop. A loss limit may stop the rollercoaster feature at a point where a set loss has been incurred, and bonus stop may stop the rollercoaster feature after a bonus feature has been played out to the user.

In some example embodiments, the user can choose to not see the trigger sequence, or bonus feature, of the underlying slot game. Accordingly, only the rollercoaster feature is displayed to the user, and the display is not updated to show the underlying reels at any stage. This may allow for even faster gameplay.

It will of course be appreciated that not only a rollercoaster may be used to convey the relevant information to a user. Any type of amusement ride, vehicle ride, or any suitable alternative graphical display may be provided and simulated. The type of ride may be configured to match a theme of an underlying slot game—an exploration-based slot game may offer an ancient mine cart ride, a dragon-based slot game may offer a ride on a dragon, etc. The background of such rides may match the theme as well, and may even incorporate graphics of the underlying slot game.

The probabilities associated with the underlying slot game can influence a user's experience during the alternative graphical display and associated virtual environment. For example, a low volatility slot game can result in an alternative graphical display with several small ups and downs, as small wins can be achieved regularly. In contrast, a high volatility game, which may provide greater wins but spread out over longer periods, can result in an alternative graphical display with extended climbs and drops. A user's preferred game volatility can be reflected in the alternative graphical display feature associated with the game.

It will be apparent that the alternative graphical display may be based on a probabilistic model underlying any type of game, not necessarily a reel-based slot game. All that is important is the result of the underlying game, which will then be transformed to a graphical display format.

Processing several consecutive results as a set, and providing a user with an averaged change may allow a user to more easily recognize trends. A track or path need not be visible to a user, for example in a simulation of a flying ride.

The speed of the rollercoaster cart may be expected to simulate a physical environment. For example, the cart can move slowly when it ascends an incline, and can speed up when moving down a decline. This may not always be desirable, whether for processing capabilities in generating the track, or for gameplay requirements. As example, the rollercoaster feature may be selected specifically because the user wishes to speed up gameplay of the underlying slot game. Then, a slow rise associated with an incline may not be desirable. The speed of the cart may thus be adjusted as required.

The horizontal length of track corresponding to each individual wager on the underlying slot game may not be the same for all wins or all losses. A win may be significantly greater than a bet size. A single bet that is lost may cause a rise in the track, but a win that is as much as three times the size of the wager, which may easily be achieved, may then not work if mapped in the same manner. A decline in the track that is three times steeper than the rise for a single bet may not provide a suitable viewing experience. Instead, the horizontal distance travelled in order to decline by the appropriate amount may be increased. This may be done as and when required to provide a desirable viewing experience. Such adjustment may emphasize certain aspects of gameplay, namely notable wins or the like.

The trigger event that leads to the alternative graphical display being modified can be associated with regulatory requirements. For example, if a set daily loss limit has been reached, it may be considered to be a trigger event. The graphical display may be modified to show the user details of their gameplay, and possibly explain to them the reason for the break from the alternative graphical display. Similar trigger features may be that a set amount has been wagered per day, that a predetermined time limit has been exceeded, or the like.

The alternative graphical display feature may provide a user with the opportunity to speed up play of a reel-based slot game, whilst still enjoying the desired benefits and advantages thereof. By removing the delay in waiting for slots to be displayed to the user, the user's gameplay may be sped up significantly. It is believed a result may be processed and communicated to a user multiple times quicker than in a standard reel-based slot environment. However, the user is still informed of the results of any wagers placed on the underlying reel-based slot game, potentially in a more efficient manner than if the user were only to look at a numerical update after each spin. Certainly, the addition of an amusement-type ride adds an element of entertainment to a user's monitoring of their results, which adds to player excitement over simply watching numbers.

Should a user wish to play out or view a bonus round of the underlying slot game, the alternative graphical display feature can be arranged to allow the user to break from the graphical view, and see the bonus feature. The increased speed of result processing allows a user to reach such bonus round faster during game play, than if they had to play and view all spins of reels which did not lead to a win. However, the user can have an option to skip such bonus games, and not break out from the alternative graphical display feature. Even then, the increased speed of play, along with the efficient communication of information relating to the user's performance in terms of monetary gains or losses, remain.

The alternative graphical display may be used as described above, where it replaces normal slot reel display. It is, however, envisaged that it may be employed as a bonus feature, where a user may win multiple free spin, for example 100 free spins. Those free spins may then be shown to the user in the format of an alternative graphical display, for example in a rollercoaster format with the characteristics as described above. Triggering the free spins feature may then cause the rollercoaster feature to load and display, where a normal display mode may be the normal reel-based slots being shown.

When the present systems and methods are incorporated into a wager-based system, a user that wishes to place a bet or wager on the outcome of a spin may need to establish a credit balance in an account that allows them to take part in the systems and methods. This may be, for example, the provision of a physical item that represents a monetary currency in a dedicated gaming machine, credit card details allowing an operator of the systems and methods to retrieve money for play of the game, an account associated with the operator or being accessible by the operator from which a credit value may be used, or the like. It is envisaged that, in the event of a user winning after a wager, payment of the user's winnings may be made into such an account or may be paid out in any other suitable format. At the end of play, any winnings may be added to the user's account.

Figure 15:
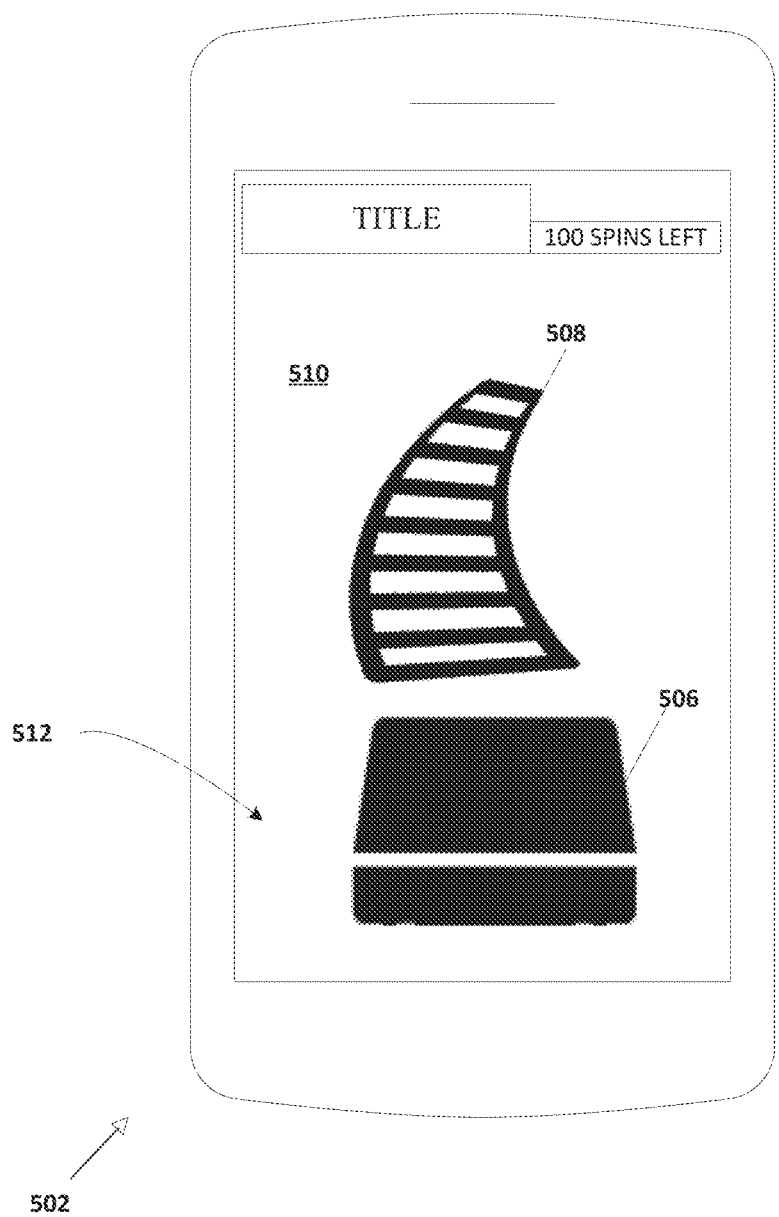
FIG. 15 is an example client device displaying a graphical user interface, in accordance with example embodiments.

FIG. 15 is an example client device displaying a graphical user interface, in accordance with example embodiments. For example, the client device can be a mobile computing device (e.g., mobile computing device 118). The display format 512 can include a title block and a spin counter. The virtual environment can be configured to display a format as described with reference to any of FIGS. 6-14. For example, the virtual environment can be configured to simulate a user experience for the user to experience the ride as described with reference to FIG. 14. The track 508 can be rendered to appear to extend in front of the cart 506. A surrounding background 510 can be updated with display elements as appropriate.

Figure 16:
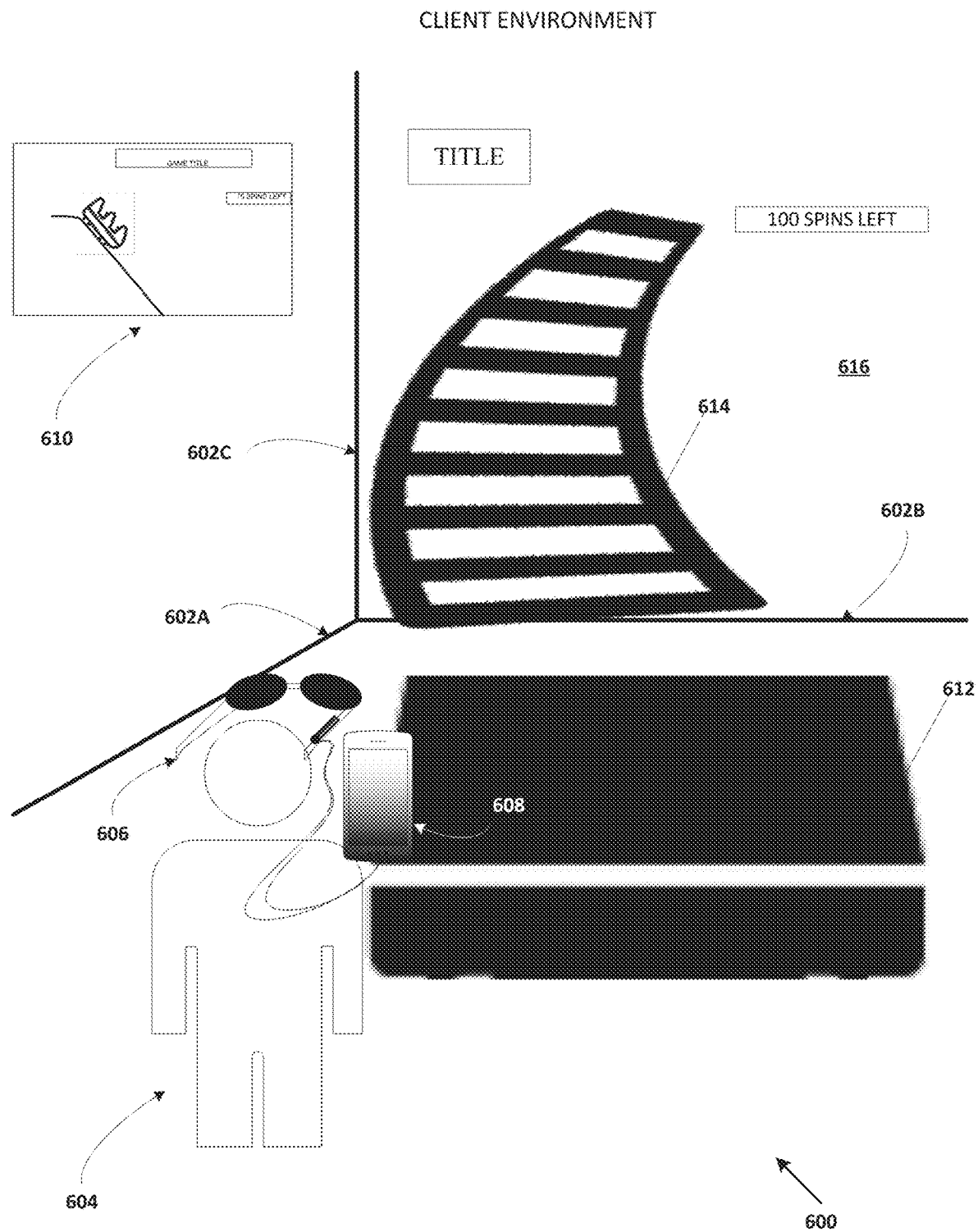
FIG. 16 is an example client environment displaying a graphical user interface, in accordance with example embodiments.

FIG. 16 is an example client environment displaying a graphical user interface, in accordance with example embodiments. For example, the client environment 600 (e.g., client environment 104) can be a virtual reality (VR) environment or an augmented reality (AR) environment. The display format can be a three-dimensional rendering of a format as described with reference to any of FIGS. 6-14. For example, the display format can be represented with respect to a three-dimensional coordinate system, where line 602A can represent a reference x-axis, line 602B can represent a reference y-axis, and line 602C can represent a reference z-axis. The transforming of the information to the display format can be a transforming of the information to the points in the three-dimensional coordinate system. A user 604 can utilize one or more headsets (e.g., headset 606) to interact with the client environment 600. In some embodiments, headset 606 can be communicatively linked to a computing device, such as, for example, mobile computing device 608.

In some embodiments, the menu options, selectable options, and/or interactive components of the client environment 600 can be provided as three-dimensional objects. For example, the client environment 600 can display a three-dimensional title block and a three-dimensional spin counter. Also, for example, an inset display 610 can provide the user 604 an overall view of the ride, including a current position of a cart 612 on a track 614. In some aspects, the client environment 600 can be configured to simulate a user experience for the user to experience the ride as described with reference to FIG. 14. The track 614 can be a three-dimensional rendering configured to appear to extend in front of a three-dimensional cart 612. A three-dimensional surrounding background 616 can be updated with display elements as appropriate. In an augmented reality setting, one or more components of the client environment 600 can be overlaid onto real objects located in a real environment surrounding the user 604. Generally, the user 604 can be provided an immersive experience in the client environment 600, including audio-visual enhancements. For example, the audio-visual enhancements can include ambient noise that is typical of an amusement ride, for example, a clanking and/or rattling noise of wheels of the cart 612 on the track 614. Also, for example, the audio-visual enhancements can include screams of imaginary passengers sharing the amusement ride with user 604. In some aspects, the audio-visual enhancements can be tailored to preferences indicated by the user 604.

Figure 17:
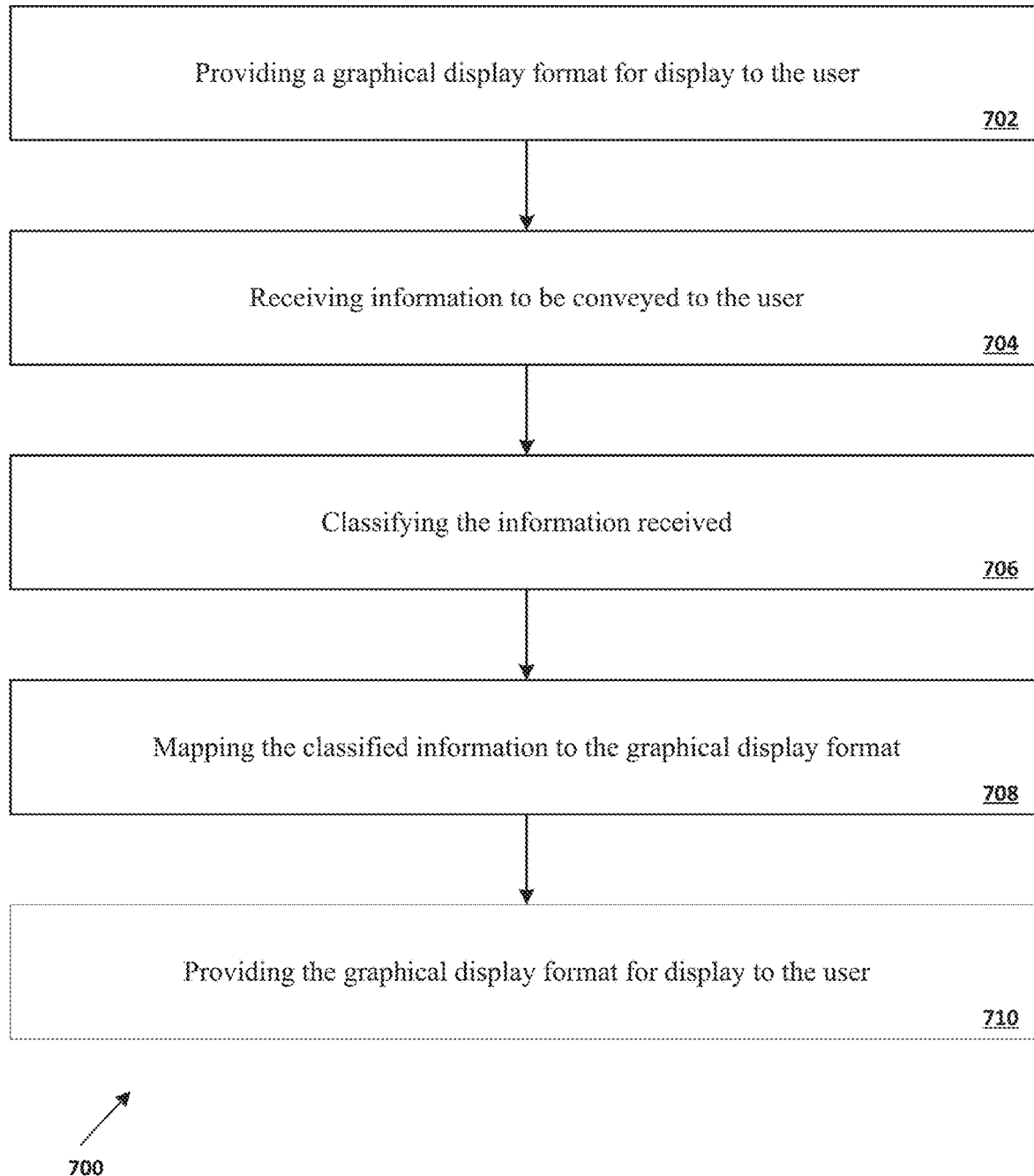
FIG. 17 is a flow diagram depicting operations performed using an electronic device, such as the multimedia content servers shown in FIGS. 1 and 2, in accordance with example embodiments.

FIG. 17 depicts an example of a flowchart of operations that can be performed using an electronic device, such as the multimedia content servers shown in FIGS. 1 and 2. It is noted that the functionality described in connection with the flowchart can be implemented via specialized and/or configured general-purpose hardware modules, a computer program or portions of program code executed by a processor for achieving specific logical functions, determinations, and/or steps described in connection with the flowchart shown in FIG. 17. Where used, program code can be stored on any type of computer-readable medium, for example, such as a storage device including a disk or hard drive.

In addition, each block of the flowchart 700 shown in FIG. 17 can represent circuitry that is wired to perform the specific logical functions in the process. Unless specifically indicated, operations in the flowchart shown in FIG. 17 can be executed out of order from that shown or discussed, including substantially concurrent execution of separately described functions, or even in reverse order in some examples, depending on the functionality involved, so long as the overall functionality of the described method is maintained.

Block 702 includes providing, to the electronic device and to a display associated therewith, a graphical display format for display to a user.

Block 704 includes receiving information to be conveyed to the user.

Block 706 includes classifying the information received according to predetermined criteria.

Block 708 includes transforming the classified information to a graphical display format.

Block 710 includes providing the graphical display format for display to the user.

Figure 18:
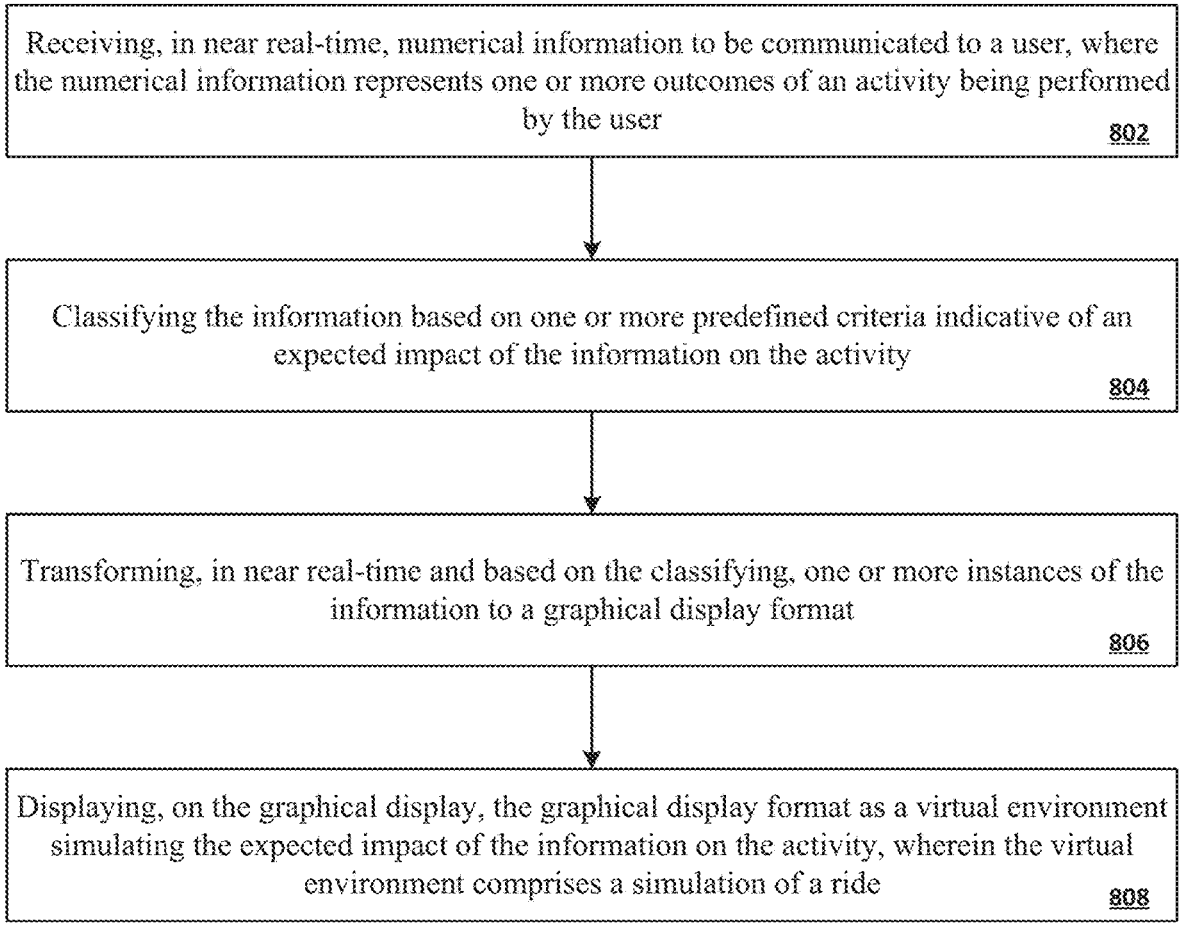
FIG. 18 is another flow diagram depicting operations performed using an electronic device, such as the multimedia content servers shown in FIGS. 1 and 2, in accordance with example embodiments.

FIG. 18 depicts another example of a flowchart of operations that can be performed using an electronic device, such as the multimedia content servers shown in FIGS. 1 and 2. It is noted that the functionality described in connection with the flowchart can be implemented via specialized and/or configured general-purpose hardware modules, a computer program or portions of program code executed by a processor for achieving specific logical functions, determinations, and/or steps described in connection with the flowchart shown in FIG. 18. Where used, program code can be stored on any type of computer-readable medium, for example, such as a storage device including a disk or hard drive.

In addition, each block of the flowchart 800 shown in FIG. 18 can represent circuitry that is wired to perform the specific logical functions in the process. Unless specifically indicated, operations in the flowchart shown in FIG. 18 can be executed out of order from that shown or discussed, including substantially concurrent execution of separately described functions, or even in reverse order in some examples, depending on the functionality involved, so long as the overall functionality of the described method is maintained.

Block 802 includes receiving, in near real-time, numerical information to be communicated to a user, wherein the numerical information represents one or more outcomes of an activity being performed by the user.

Block 804 includes classifying the information based on one or more predefined criteria indicative of an expected impact of the information on the activity.

Block 806 includes transforming, in near real-time and based on the classifying, one or more instances of the information to a graphical display format.

Block 808 includes displaying, on the graphical display, the graphical display format as a virtual environment simulating the expected impact of the information on the activity, wherein the virtual environment comprises a simulation of a ride.

In some examples, classifying the information received may include classifying the information as one of: a net positive result, a net negative result, or a neutral result.

Some examples include an upward incline of a trajectory of the ride to indicate a net negative result. An angle of the incline above a reference horizontal line may be indicative of a value of the net negative result.

Some examples include a downward incline of a trajectory of the ride to indicate a net positive result. An angle of the incline below a reference horizontal line may be indicative of a value of the net positive result.

In some examples, a vertical height of the ride may be proportional to the value.

In some examples, a shape of a trajectory of the ride may include one or more of: a straight line, a loop, a twist, or a turn.

In some examples, the virtual environment may be configured to adapt to a movement of the ride to maintain a visibility of a current position of the ride to the user.

In some examples, the virtual environment includes an upper horizontal line indicative of a first threshold value of a net negative result. A current position of the ride above the upper horizontal line may indicate that a value of a net negative result is greater than the first threshold value. In some examples, a portion of the graphical display above the upper horizontal line is configured to display one or more images of a cloud rendered in one or more shades of a color.

For example, a darker shade of the color indicates a larger value of the net negative result.

In some examples, the virtual environment includes a lower horizontal line indicative of a second threshold value of a net positive result. A current position of the ride below the lower horizontal line may indicate that a value of a net positive result is greater than the second threshold value. In some examples, a portion of the graphical display below the lower horizontal line may be configured to display an image of water rendered in one or more shades of a color. For example, a darker shade of the color may be indicative of a larger value of the net positive result.

In some examples, the activity being performed by the user is participation in a virtual reel-based slot game.

In some examples, triggering of a bonus feature of the slot game may be detected. Accordingly, in response to detecting that the bonus feature has been triggered, a trigger sequence may be displayed.

In some examples, ending of a bonus game associated with the trigger sequence may be detected. Accordingly, in response to detecting that the bonus game has ended, the display of the virtual environment may be resumed.

In some examples, the ride may appear to move on a track. The track may be rendered to appear to extend in front of the ride. The virtual environment may be configured to simulate a user experience for the user to experience the ride as it moves on the track.

In some examples, the simulation of the ride may include a rollercoaster cart simulated to move on a track. In some examples, the ride may include at least one of: a mine cart ride or a dragon ride. In some examples, the simulation of the ride may include a first-person perspective of the ride.

IV. ADDITIONAL EXAMPLE EMBODIMENTS

The techniques disclosed in the examples described above can be applied to solve problems not relating to gaming as per the example provided. For example, in the financial industry, user account values are often provided in numerical formats only. Some users, in particular traders or the like, may wish to be informed of a value of a financial instrument or portfolio in a more efficient manner.

As an example, a user may wish to view the value of their financial portfolio, and also the change in value over time. The present systems and method may allow a user to view changes to the value of their portfolio in real time, or may allow the user to view the changes to their portfolio over an extended period of time. The user may be allowed to set limits or boundaries that may affect the background of the graphical display, and the present systems and methods may allow the user to recognize the performance and position of their portfolio when considering the preset limits. External factors may be used to update the limits, for example performance in relation to other funds, other markets, or other industries. This may instantly provide a user with a summary of their financial position in a graphical display format, which may be a more efficient way to communicate such information to the user instead of by providing numerical values only.

Also, for example, the displaying of the graphical display format as a virtual environment can be provided to a third party, other than the user. For example, the user can be utilizing the display to view health related information, and can choose to share such information with an approved third party such as a medical practitioner, health care provider, a personal trainer, and so forth. As another example, the user can be utilizing the display to view financial information, and can choose to share such information with an approved third party such as a personal finance manager, a financial institution, family and/or friends, and so forth. Also, for example, the user can be utilizing the display to view driving related information, and can choose to share such information with an approved third party such as an insurance provider, auto manufacturer, and so forth.

In some embodiments, the displaying of the graphical display format as a virtual environment can be provided as a service to one or more external clients, such as, for example, a health care provider, a financial institution, an insurance agency, and so forth. In some examples, news organizations, event organizers, and/or viewing party hosts can broadcast and/or display the virtual environment as an experiential "shorthand" for variations in the financial markets, sporting events, and/or betting events. For example, the external client can provide the information to electronic device, such as the multimedia content servers shown in FIGS. 1 and 2. The electronic device can then transform the information received into the graphical display format, and provide the graphical display format as a virtual environment to the external client. In some examples, the display can be provided by the electronic device based on a subscription model, such as via a cloud serving environment, as a software-as-a-service (SaaS) package, as a software program stored on a computer storage medium, and so on. In some examples, the display can be provided by the electronic device based on a licensing model, and an external client can also have an ability to customize the display based on their respective applications.

V. CONCLUSION

Thus, from one perspective, there have now been described a computer-implemented method, a multimedia content server, and a computer-readable medium. An example method for presenting information on a graphical display to a user performing an activity includes receiving, in near real-time, numerical information to be communicated to the user. The numerical information represents one or more outcomes of the activity. Additionally, the method includes classifying the information based on one or more predefined criteria indicative of an expected impact of the information on the activity. Further, the method includes transforming, in near real-time and based on the classifying, one or more instances of the information to a graphical display format. Still further, the method includes displaying, on the graphical display, the graphical display format as a virtual environment simulating the expected impact of the information on the activity. The virtual environment includes a simulation of a ride.

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively, or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random-access memory (RAM). The computer-readable media can include non-transitory computer-readable media that stores program code and/or data for longer periods of time, such as secondary or persistent long-term storage, like read-only memory (ROM), optical or magnetic disks, and/or compact-disc read-only memory (CD-ROM), for example. The computer-readable media can be any other volatile or non-volatile storage systems. A computer-readable medium can be considered a computer-readable storage medium, for example, or a tangible storage device.

Software for use in carrying out the disclosed embodiments can also be in transitory form, for example in the form of signals transmitted over a network such as the Internet. Moreover, a step or block that represents one or more information transmissions can correspond to information transmissions between software and/or hardware modules in the same physical device. However, other information transmissions can be between software modules and/or hardware modules in different physical devices.

Further, the described operations throughout this application need not be performed in the disclosed order. Also, not all operations need to be performed to achieve the desired advantages of disclosed machines and methods, and therefore not all operations are required.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While examples have been described in terms of select embodiments, alterations and permutations of these embodiments will be apparent to those of ordinary skill in the art. Other changes, substitutions, and alterations are also possible without departing from the disclosed machines and methods in their broader aspects as set forth in the following claims.

Further example embodiments are described below with reference to the following clauses.

Clause 1. A computer-implemented method, for presenting information on a graphical display to a user performing an activity comprising: receiving, in near real-time, numerical information to be communicated to the user, the numerical information representing one or more outcomes of the activity; classifying the information based on one or more predefined criteria indicative of an expected impact of the information on the activity; transforming, in near real-time and based on the classifying, one or more instances of the information to a graphical display format; and displaying, on the graphical display, the graphical display format as a virtual environment simulating the expected impact of the information on the activity, wherein the virtual environment comprises a simulation of a ride.

Clause 2. The computer-implemented method according to clause 1, wherein classifying the information received comprises classifying the information as one of: a net positive result, a net negative result, or a neutral result.

Clause 3. The computer-implemented method according to clauses 1 or 2, wherein an upward incline of a trajectory of the ride is indicative of a net negative result, and wherein an angle of the incline above a reference horizontal line is indicative of a value of the net negative result.

Clause 4. The computer-implemented method according to clauses 1 or 2, wherein a downward incline of a trajectory of the ride is indicative of a net positive result, and wherein an angle of the incline below a reference horizontal line is indicative of a value of the net positive result.

Clause 5. The computer-implemented method according to clauses 3 or 4, wherein a vertical height of the ride is proportional to the value.

Clause 6. The computer-implemented method according to any preceding clause, wherein a shape of a trajectory of the ride comprises one or more of: a straight line, a loop, a twist, or a turn.

Clause 7. The computer-implemented method according to any preceding clause, wherein the virtual environment is configured to adapt to a movement of the ride to maintain a visibility of a current position of the ride to the user.

Clause 8. The computer-implemented method according to any preceding clause, wherein the virtual environment comprises an upper horizontal line indicative of a first threshold value of a net negative result, and wherein a current position of the ride above the upper horizontal line indicates that a value of a net negative result is greater than the first threshold value.

Clause 9. The computer-implemented method according to clause 8, wherein a portion of the graphical display above the upper horizontal line is configured to display one or more images of a cloud rendered in one or more shades of a color, and wherein a darker shade of the color is indicative of a larger value of the net negative result.

Clause 10. The computer-implemented method according to any preceding clause, wherein the virtual environment comprises a lower horizontal line indicative of a second threshold value of a net positive result, and wherein a current position of the ride below the lower horizontal line indicates that a value of a net positive result is greater than the second threshold value.

Clause 11. The computer-implemented method according to clause 10, wherein a portion of the graphical display below the lower horizontal line is configured to display an image of water rendered in one or more shades of a color, and wherein a darker shade of the color is indicative of a larger value of the net positive result.

Clause 12. The computer-implemented method according to any preceding clause, wherein the activity being performed by the user is participation in a virtual reel-based slot game.

Clause 13. The computer-implemented method according to any preceding clause, comprising: detecting that a bonus feature of the slot game has been triggered; and in response to detecting that the bonus feature has been triggered, displaying a trigger sequence.

Clause 14. The computer-implemented method according to clause 13, comprising: detecting that a bonus game associated with the trigger sequence has ended; and resuming the displaying of the virtual environment.

Clause 15. The computer-implemented method according to any preceding clause, wherein the ride appears to move on a track, wherein the track is rendered to appear to extend in front of the ride, and wherein the virtual environment is configured to simulate a user experience for the user to experience the ride as it moves on the track.

Clause 16. The computer-implemented method according to any preceding clause, wherein the simulation of the ride comprises a rollercoaster cart simulated to move on a track.

Clause 17. The computer-implemented method according to any preceding clause, wherein the ride comprises at least one of: a mine cart ride or a dragon ride.

Clause 18. The computer-implemented method according to any preceding clause, wherein the simulation of the ride comprises a first-person perspective of the ride.

Clause 19. The computer-implemented method according to any preceding clause, wherein the numerical information to be communicated to the user comprises at least one of: information related to a trading platform associated with the user, information related to a financial portfolio of the user, a cost function for manufacturing products, a revenue function from a sale of products, information generated in a gaming environment, or information generated in a gambling activity.

Clause 20. The computer-implemented method according to any preceding clause, wherein the numerical information to be communicated to the user comprises information related to user behavior, wherein a net positive result is associated with a reward for positive behavior, a net negative result is associated with a deduction for negative behavior, and a neutral outcome is associated with a neutral behavior.

Clause 21. The computer-implemented method according to any preceding clause, wherein the one or more predefined criteria is based on a probabilistic modeling of a game.

Clause 22. The computer-implemented method according to any preceding clause, wherein the displaying of the graphical display format as a virtual environment comprises at least one of: displaying on a mobile device, displaying in an augmented reality environment, displaying in a virtual reality environment, or displaying on a display in a vehicle.

Clause 23. The computer-implemented method according to any preceding clause, wherein the displaying of the graphical display format as a virtual environment comprises at least one of: providing the graphical display format as a service to one or more external clients, providing the graphical display format to another user under a subscription model, providing the graphical display format to another user under a licensing model, or providing the graphical display format to another user approved by the user.

Clause 24. A multimedia content server comprising: a memory device; and a processor in communication with the memory device, wherein the memory devices stores instruction code that when executed by the processor causes the multimedia content server to perform the methods of any of clauses 1-23.

Clause 25. Non-transitory computer-readable media having stored thereon instruction code executable by a processor of a multimedia content server to cause the multimedia content server to perform the methods of any of clauses 1-23.

Clause 26. A computing device including at least one processor, a memory component, and program instructions stored in the memory component that, upon execution by the at least one processor, cause the computing device to perform the methods of any of clauses 1-23.

Clause 27. A system including various means to perform the methods of any of clauses 1-23.

Clause 28. A computer program including machine-readable instructions executable to cause a computing device to perform the methods of any of clauses 1-23.

What is claimed is:

1. A computer-implemented method for presenting information on a graphical display to a user participating in a virtual reel-based slot game, the method comprising:
   receiving, in near real-time, numerical information to be communicated to the user, the numerical information representing one or more outcomes of the virtual reel-based slot game;
   classifying the numerical information based on one or more predefined criteria indicative of an expected impact of the numerical information on the virtual reel-based slot game to obtain classified information representing the one or more outcomes of the virtual reel-based slot game;
   transforming, in near real-time and based on the classifying, the classified information to a graphical display format; and
   displaying, on the graphical display, the graphical display format as a virtual environment simulating the expected impact of the numerical information on the virtual reel-based slot game,
   wherein;
      the virtual environment comprises a simulation of a ride,
      an upward incline of a trajectory of the ride is indicative of a net negative result, and
      an angle of the upward incline above a reference horizontal line is indicative of a value of the net negative result.

2. The computer-implemented method of claim 1, wherein classifying the numeric information comprises classifying the information as one of: a net positive result, the net negative result, or a neutral result.

3. The computer-implemented method of claim 1, wherein:
   a downward incline of a trajectory of the ride is indicative of a net positive result, and
   an angle of the downward incline below a reference horizontal line is indicative of a value of the net positive result.

4. The computer-implemented method of claim 3, wherein a vertical height of the ride is proportional to the value of the net negative result or the value of the net positive result.

5. The computer-implemented method of claim 1, wherein a shape of a trajectory of the ride comprises one or more of: a straight line, a loop, a twist, or a turn.

6. The computer-implemented method of claim 1, wherein the virtual environment is configured to adapt to a movement of the ride to maintain a visibility of a current position of the ride to the user.

7. The computer-implemented method of claim 1, comprising:
detecting that a bonus feature of the virtual reel-based slot game has been triggered; and
in response to detecting that the bonus feature has been triggered, displaying a trigger sequence.

8. The computer-implemented method of claim 7, comprising:
detecting that a bonus game associated with the trigger sequence has ended; and
resuming the displaying of the virtual environment.

9. The computer-implemented method of claim 1, wherein:
the ride appears to move on a track,
the track is rendered to appear to extend in front of the ride, and
the virtual environment is configured to simulate a user experience for the user to experience the ride as it moves on the track.

10. The computer-implemented method of claim 1, wherein the simulation of the ride comprises a rollercoaster cart simulated to move on a track.

11. The computer-implemented method of claim 1, wherein the ride comprises at least one of: a rollercoaster cart, a mine cart ride or a dragon ride.

12. The computer-implemented method of claim 1, wherein the simulation of the ride comprises a first-person perspective of the ride.

13. The computer-implemented method of claim 1, wherein the numerical information to be communicated to the user comprises at least one of: information generated in a gaming environment, or information generated in a gambling activity.

14. The computer-implemented method of claim 1, wherein:
the numerical information to be communicated to the user comprises information related to user behavior, and
a net positive result is associated with a reward for positive behavior, a net negative result is associated with a deduction for negative behavior, and a neutral outcome is associated with a neutral behavior.

15. The computer-implemented method of claim 1, wherein the one or more predefined criteria is based on a probabilistic modeling of a game.

16. The computer-implemented method of claim 1, wherein the displaying of the graphical display format as the virtual environment comprises at least one of: displaying on a mobile device, displaying in an augmented reality environment, displaying in a virtual reality environment, or displaying on a display in a vehicle.

17. The computer-implemented method of claim 1, wherein the displaying of the graphical display format as the virtual environment comprises at least one of: providing the graphical display format as a service to one or more external clients, providing the graphical display format to another user under a subscription model, providing the graphical display format to another user under a licensing model, or providing the graphical display format to another user approved by the user.

18. The computer-implemented method of claim 1, wherein the numerical information representing one or more outcomes of the virtual reel-based slot game is based on a respective wager placed by the user for each outcome.

19. The computer-implemented method of claim 18, further comprising:
adding, to an account associated with the user, any winnings based on the respective wager placed by the user for each outcome.

20. A computer-implemented method for presenting information on a graphical display to a user participating in a virtual reel-based slot game, the method comprising:
receiving, in near real-time, numerical information to be communicated to the user, the numerical information representing one or more outcomes of the virtual reel-based slot game;
classifying the numerical information based on one or more predefined criteria indicative of an expected impact of the numerical information on the virtual reel-based slot game to obtain classified information representing the one or more outcomes of the virtual reel-based slot game;
transforming, in near real-time and based on the classifying, the classified information to a graphical display format; and
displaying, on the graphical display, the graphical display format as a virtual environment simulating the expected impact of the numerical information on the virtual reel-based slot game,
wherein:
the virtual environment comprises a simulation of a ride,
the virtual environment comprises an upper horizontal line indicative of a first threshold value of a net negative result, and
a current position of the ride above the upper horizontal line indicates that a value of a net negative result is greater than the first threshold value.

21. The computer-implemented method of claim 20, wherein:
a portion of the graphical display above the upper horizontal line is configured to display one or more images of a cloud rendered in one or more shades of a color, and
a darker shade of the color is indicative of a larger value of the net negative result.

22. A computer-implemented method for presenting information on a graphical display to a user participating in a virtual reel-based slot game, the method comprising:
receiving, in near real-time, numerical information to be communicated to the user, the numerical information representing one or more outcomes of the virtual reel-based slot game;
classifying the numerical information based on one or more predefined criteria indicative of an expected impact of the numerical information on the virtual reel-based slot game to obtain classified information representing the one or more outcomes of the virtual reel-based slot game;
transforming, in near real-time and based on the classifying, the classified information to a graphical display format; and
displaying, on the graphical display, the graphical display format as a virtual environment simulating the expected impact of the numerical information on the virtual reel-based slot game,
wherein:
the virtual environment comprises a simulation of a ride, the virtual environment comprises a lower horizontal line indicative of a second threshold value of a net positive result, and a current position of the ride below the lower horizontal line indicates that a value of a net positive result is greater than the second threshold value.

23. The computer-implemented method of claim 22, wherein:

a portion of the graphical display below the lower horizontal line is configured to display an image of water rendered in one or more shades of a color, and a darker shade of the color is indicative of a larger value of the net positive result.

24. A multimedia content server for presenting information on a graphical display to a user participating in a virtual reel-based slot game, the multimedia content server comprising:

a memory device; and a processor in communication with the memory device, wherein the memory device stores instruction code that when executed by the processor causes the multimedia content server to perform operations comprising:

receiving, in near real-time, numerical information to be communicated to the user, the numerical information representing one or more outcomes of the virtual reel-based slot game;

classifying the numerical information based on one or more predefined criteria indicative of an expected impact of the numerical information on the virtual reel-based slot game to obtain classified information representing the one or more outcomes of the virtual reel-based slot game;

transforming, in near real-time and based on the classifying, the classified information to a graphical display format; and displaying, on the graphical display, the graphical display format as a virtual environment simulating the expected impact of the numerical information on the virtual reel-based slot game, wherein;

the virtual environment comprises a simulation of a ride, and one or more lines selected from the group consisting of: an upper horizontal line indicative of a first threshold value of a net negative result, and a lower horizontal line indicative of a second threshold value of a net positive result, a current position of the ride above the upper horizontal line indicates that a value of a net negative result is greater than the first threshold value, and a current position of the ride below the lower horizontal line indicates that a value of a net positive result is greater than the second threshold value.

25. A non-transitory computer-readable medium comprising computer-implementable instructions configured to cause a processor of a multimedia content server to cause the multimedia content server to present information on a graphical display to a user participating in a virtual reel-based slot game, comprising the following operations:

receiving, in near real-time, numerical information to be communicated to the user, the numerical information representing one or more outcomes of the virtual reel-based slot game;

classifying the numerical information based on one or more predefined criteria indicative of an expected impact of the numerical information on the virtual reel-based slot game to obtain classified information representing the one or more outcomes of the virtual reel-based slot game;

transforming, in near real-time and based on the classifying, the classified information to a graphical display format; and displaying, on the graphical display, the graphical display format as a virtual environment simulating the expected impact of the numerical information on the virtual reel-based slot game, wherein:

the virtual environment comprises a simulation of a ride, and one or more lines selected from the group consisting of: an upper horizontal line indicative of a first threshold value of a net negative result, and a lower horizontal line indicative of a second threshold value of a net positive result, a current position of the ride above the upper horizontal line indicates that a value of a net negative result is greater than the first threshold value, and a current position of the ride below the lower horizontal line indicates that a value of a net positive result is greater than the second threshold value.

* * * * *